United States Patent
Honda et al.

(10) Patent No.: US 11,760,062 B2
(45) Date of Patent: Sep. 19, 2023

(54) ARTICLE HAVING SURFACE TREATMENT LAYER

(71) Applicant: DAIKIN INDUSTRIES, LTD., Osaka (JP)

(72) Inventors: Yoshiaki Honda, Settsu (JP); Takeshi Maehira, Shanghai (CN)

(73) Assignee: DAIKIN INDUSTRIES, LTD., Osaka (JP)

( * ) Notice: Subject to any disclaimer, the term of this patent is extended or adjusted under 35 U.S.C. 154(b) by 1066 days.

(21) Appl. No.: 15/772,997

(22) PCT Filed: Nov. 4, 2016

(86) PCT No.: PCT/JP2016/082808
§ 371 (c)(1),
(2) Date: May 2, 2018

(87) PCT Pub. No.: WO2017/078141
PCT Pub. Date: May 11, 2017

(65) Prior Publication Data
US 2018/0326701 A1    Nov. 15, 2018

(30) Foreign Application Priority Data

Nov. 5, 2015 (CN) ........................ 201510744809.X

(51) Int. Cl.

| | |
|---|---|
| *B32B 9/00* | (2006.01) |
| *B32B 27/00* | (2006.01) |
| *C04B 41/52* | (2006.01) |
| *G02B 1/14* | (2015.01) |
| *B32B 27/08* | (2006.01) |
| *B32B 7/12* | (2006.01) |
| *B32B 27/24* | (2006.01) |
| *C04B 41/89* | (2006.01) |
| *C04B 41/00* | (2006.01) |
| *G02B 1/12* | (2006.01) |

(52) U.S. Cl.
CPC ............... *B32B 9/007* (2013.01); *B32B 9/00* (2013.01); *B32B 27/00* (2013.01); *B32B 27/08* (2013.01); *C04B 41/009* (2013.01); *C04B 41/52* (2013.01); *C04B 41/89* (2013.01); *G02B 1/12* (2013.01); *G02B 1/14* (2015.01); *B32B 7/12* (2013.01); *B32B 27/24* (2013.01); *B32B 2307/412* (2013.01)

(58) Field of Classification Search
None
See application file for complete search history.

(56) References Cited

U.S. PATENT DOCUMENTS

| | | | |
|---|---|---|---|
| 2010/0328605 A1 | 12/2010 | Suzuki | |
| 2013/0108876 A1 | 5/2013 | Komori et al. | |
| 2013/0222913 A1 | 8/2013 | Tomoda et al. | |
| 2015/0307719 A1* | 10/2015 | Mitsuhashi | .......... C09D 171/02 428/447 |
| 2015/0355380 A1 | 12/2015 | Apitz et al. | |
| 2016/0340544 A1 | 11/2016 | Katsukawa et al. | |

FOREIGN PATENT DOCUMENTS

| | | | | |
|---|---|---|---|---|
| JP | 2002274885 A | * | 9/2002 | ............. C03C 17/25 |
| JP | 2007-233333 A | | 9/2007 | |
| JP | 2013-117012 A | | 6/2013 | |
| JP | 2015-230486 A | | 12/2015 | |
| WO | WO-2010125926 A1 | * | 11/2010 | ........... C23C 16/401 |
| WO | 2012/043218 A1 | | 4/2012 | |
| WO | 2012/117386 A1 | | 9/2012 | |
| WO | WO-2014069592 A1 | * | 5/2014 | ........... C09D 5/1625 |
| WO | 2015/099085 A1 | | 7/2015 | |

OTHER PUBLICATIONS

English machine translation of WO-2010125926 (2010).*
English machine translation of JP-2002-274885 (2002).*
Extended European Search Report dated May 9, 2019 for counterpart European Application No. 16862200.9.
International Preliminary Report on Patentability with a Translation of Written Opinion in International Application No. PCT/JP2016/082808, dated May 17, 2018.
International Search Report of PCT/JP2016/082808 dated Jan. 24, 2017 [PCT/ISA/210].

* cited by examiner

*Primary Examiner* — Kenneth J Stachel
(74) *Attorney, Agent, or Firm* — Sughrue Mion, PLLC

(57) ABSTRACT

An article including a base material of zirconium oxide, an intermediate layer located on the base material, and a surface treating layer formed from a surface treating agent containing a fluorine-containing silane compound located on the intermediate layer, wherein the intermediate layer includes one or more metal oxides. Also disclosed is a process for forming the surface treating layer and a process for producing the article.

18 Claims, No Drawings

ARTICLE HAVING SURFACE TREATMENT LAYER

CROSS REFERENCE TO RELATED APPLICATIONS

This application is a National Stage of International Application No. PCT/JP2016/082808, filed Nov. 4, 2016, claiming priority based on Chinese Patent Application No. 201510744809.X, filed Nov. 5, 2015.

TECHNICAL FIELD

The present invention relates to an article comprising a surface treating layer, in particular an article comprising a surface treating layer formed from a surface treating agent comprising a fluorine-containing silane compound and a process for producing thereof.

BACKGROUND ART

A certain fluorine-containing compound is known to be able to provide excellent water-repellency, oil-repellency, antifouling property, or the like when it is used in a surface treatment of a base material. As such fluorine-containing silane compound, a perfluoropolyether group containing silane compound which has a perfluoropolyether group in its main molecular chain and a hydrolyzable group bonding to a Si atom in its molecular terminal or terminal portion is known. For example, Patent Document 1 disclose a perfluoropolyether group containing silane compound having a hydrolyzable group bonding to a Si atom in its molecular terminal or terminal portion.

The layer (hereinafter, referred to as a "surface-treating layer") formed from a surface-treating agent comprising a fluorine-containing silane compound as mentioned above is applied to a glass, etc. as a so-called functional thin film. In particular, the surface treating layer has been suitably used in an optical member such as glasses, a touch panel, an operation screen of the mobile terminal or the like which is required to have light permeability or transparency since it can exert the above functions even in form of a thin film.

PRIOR ART DOCUMENT

Patent Document

Patent Document 1: JP 2013-117012 A

SUMMARY OF THE INVENTION

Problem to be Solved by the Invention

For example, a glass base material is generally used in the operation screen of the mobile terminal. The surface treating layer is formed on the glass base material. On the other hand, a zirconia ceramic is often used in a surface of a housing since the zirconia ceramic has a gloss similar to diamond and has excellent design property. In the mobile terminal or the like, in particular, the friction durability is required to be further improved. However, according to the studies of the present inventors, although the surface treating layer formed on the glass base material can have sufficient friction durability, the surface treating layer formed on the zirconia ceramic have been found to have insufficient friction durability.

Therefore, an object of the present invention is to provide an article comprising the surface treating layer having higher friction durability on a base material of zirconia ceramic, i.e. the base material of zirconium oxide, and the process for producing thereof.

Means to Solve the Problem

As a result of intensively studying, the inventors of the present invention have found that, a surface treating layer having excellent friction durability can be obtained by forming a layer of a metal oxide on a base material of zirconium oxide and forming a surface treating layer from a composition comprising a fluorine-containing silane compound thereon, and the inventors reach the present invention.

According to first aspect of the present invention, there is provided an article comprising
a base material of zirconium oxide,
an intermediate layer located on the base material, and
a surface treating layer formed from a surface treating agent comprising a fluorine-containing silane compound located on the intermediate layer,
wherein the intermediate layer comprises one or more metal oxides.

According to second aspect of the present invention, there is provided a process for forming a surface treating layer from a surface treating agent comprising a fluorine-containing silane compound on a base material of zirconium oxide, comprising:
forming an intermediate layer from one or more metal oxides on the base material of zirconium oxide, and then
forming the surface treating layer from a surface treating agent comprising a fluorine-containing silane compound on the intermediate layer.

According to third aspect of the present invention, there is provided a process for producing an article comprising
a base material of zirconium oxide,
an intermediate layer located on the base material, and
a surface treating layer formed from a surface treating agent comprising a fluorine-containing silane compound located on the intermediate layer, comprising:
forming an intermediate layer from one or more metal oxides on the base material of zirconium oxide, and then,
forming the surface treating layer from a surface treating agent comprising a fluorine-containing silane compound on the intermediate layer.

Effect of the Invention

According to the present invention, a surface treating layer having higher friction durability on a base material of zirconium oxide.

EMBODIMENTS TO CARRY OUT THE INVENTION

Hereinafter, the article and the process for producing of the present invention will be described.

The article of the present invention comprises a base material of zirconium oxide, an intermediate layer located on the base material, and a surface treating layer formed on the intermediate layer.

The article of the present invention may be a housing (for example, a housing of a mobile terminal or the like), a jewelry article (for example, a dial of the clock or the like), a glassframe or the like, or the portion thereof.

The base material of zirconium oxide is a base material composed of a material mainly containing zirconium oxide as a main component. It is noted that the "main component" as used herein means the a component contained at the largest amount in the material, for example contained at 50% by mass or more.

Examples of other components contained in the base material of zirconium oxide include, but are not particularly limited to, stabilizers, coloring agents and the like.

Examples of the stabilizer include, but are not particularly limited to, a metal oxide such as magnesium oxide, calcium oxide, yttrium oxide, scandium oxide or cerium oxide.

Examples of the coloring agent include, but are not particularly limited to, an oxide or a composite oxide of Co, Cr, Fe, Mn or Ni. In one embodiment, coloring agent is $Fe_2O_3$.

The shape of the base material of zirconium oxide is not particularly limited. The surface area of the base material on which the intermediate layer and the surface treating layer should be formed may be at least part of the surface of the base material and can be appropriately determined depending on the application and the specific specification of the article to be produced.

In one embodiment, before forming the intermediate layer on the base material, a pretreatment of the base material, for example, a cleaning treatment may be performed. By performing the pretreatment, adhesion between the base material and the intermediate layer is improved, and higher friction durability can be obtained.

The intermediate layer is provided on the base material of zirconium oxide.

The intermediate layer contains one or more metal oxides and may be a single layer or a multilayer.

Examples of the metal oxide contained in an intermediate layer include, but are not particularly limited, silicon oxide (typically, $SiO_2$), aluminum oxide (typically, $Al_2O_3$), zirconium oxide (typically, $ZrO_2$), and the like.

In one embodiment, the intermediate layer comprises at least silicon oxide or aluminum oxide. By including silicon oxide or aluminum oxide in the intermediate layer, the surface treating layer having higher friction durability can be obtained on the base material.

In a preferably embodiment, the intermediate layer comprises at least silicon oxide. By including silicon oxide in the intermediate layer, the surface treating layer having higher friction durability can be obtained on the base material.

In a further preferably embodiment, the intermediate layer comprises silicon oxide and aluminum oxide. By including silicon oxide and aluminum oxide in the intermediate layer, the surface treating layer having higher friction durability can be obtained on the base material.

In the three embodiments mentioned above, the intermediate layer may further comprise zirconium oxide.

In a preferably embodiment, in the intermediate layer, silicon oxide exists in the surface at the surface treating agent side of the intermediate layer. By making silicon oxide exist in the surface at the surface treating agent side of the intermediate layer, the surface treating layer having higher friction durability can be obtained on the base material.

In a preferably embodiment, in the intermediate layer, aluminum oxide or zirconium oxide, preferably aluminum oxide exists in the surface at the base material side of the intermediate layer. By making aluminum oxide or zirconium oxide, in particular aluminum oxide exist in the surface at the base material side of the intermediate layer, the base material and the intermediate layer are strongly bonded, as the result, the surface treating layer having higher friction durability can be obtained on the base material.

The intermediate layer may be a single layer or may be composed of a plurality of layers, and preferably is composed of a plurality of layers.

When the intermediate layer is a single layer, the metal oxide contained in the intermediate layer may be one or may be two or more. In this case, the intermediate layer comprises preferably at least one or two metal oxides selected from aluminum oxide and silicon oxide.

When two or more metal oxides are contained, two or more metal oxides may be uniformly distributed or non-uniformly distributed in the intermediate layer. Preferably, more aluminum oxide or zirconium oxide, in particular aluminum oxide is present at the base material side, and more silicon oxide is present at the surface treating layer side.

When the intermediate layer is a multilayer, for example, 2 layers, 3 layers, or 4 layers, each layer may be composed of one metal oxide or two or more metal oxides, preferably is composed of one metal oxide. The intermediate layer may comprise a plurality of layers of the same metal oxide. It is noted that as long as the type of the metal oxide constituting the layer is significantly different between the adjacent layers of the metal oxide, the boundary between the layers may not always clear. For example, the both metal oxides constituting the layers are present between the adjacent layers of the metal oxide. Usually, a thickness of the region where the both metal oxides are present may be 50 nm or less, preferably 20 nm or less, more preferably 5 nm or less.

In a preferably embodiment, among the plurality of layers, the layer closest to the base material is a layer of aluminum oxide or a layer of zirconium oxide, preferably a layer of aluminum oxide, and the layer closest to the surface treating agent is a layer of silicon oxide.

Examples of the intermediate layer include the following layer structure. It is noted that the left side is the base material side, and the right side is the surface treating layer side.

(i) $SiO_2$
(ii) $Al_2O_3$
(iii) $Al_2O_3/SiO_2$
(iv) $ZrO_2/Al_2O_3/SiO_2$
(v) $Al_2O_3/SiO_2/Al_2O_3/SiO_2$ Among them, from the viewpoint of obtaining high friction durability, $Al_2O_3/SiO_2$ or $ZrO_2/Al_2O_3/SiO_2$ is preferable, and $Al_2O_3/SiO_2$ is particularly preferable. From the viewpoint of obtaining good appearance, $SiO_2$, $Al_2O_3$, $Al_2O_3/SiO_2$ or $Al_2O_3/SiO_2/Al_2O_3/SiO_2$ is preferable, and $Al_2O_3/SiO_2$ is particularly preferable.

The thickness of the intermediate layer (when a plurality of layer are present, the thickness is a total thickness of the layers) is, but not particularly limited to, preferably 5 nm or more, more preferably 10 nm or more, further preferably 20 nm or more, further more preferably 30 nm or more, and preferably 80 nm or less, more preferably 50 nm or less. By setting the thickness of the intermediate layer to the range mentioned above, the surface treating layer having higher friction durability can be obtained.

When the intermediate layer is composed of a plurality of layers, the thickness of each layer is, but not particularly limited to, preferably 5 nm or more, more preferably 10 nm or more, further preferably 15 nm or more, and preferably 50 nm or less, more preferably 30 nm or less, further preferably 20 nm or less. By setting the thickness of each layer to the range mentioned above, the surface treating layer having higher friction durability can be obtained.

The thickness of the intermediate layer can be calculated based on the etching rate obtained by repeating the operations of etching a surface of the base material surface-treated from the surface treating layer side by an argon cluster ion beam (Ar-GCIB) and measuring an atomic concentration by an X-ray photoelectron spectroscopy (XPS).

In a preferably embodiment, the intermediate layer is selected from:
(i) $SiO_2$
(ii) $Al_2O_3$
(iii) $Al_2O_3/SiO_2$
(iv) $ZrO_2/Al_2O_3/SiO_2$
(v) $Al_2O_3/SiO_2/Al_2O_3/SiO_2$, the thickness of the intermediate layer (when a plurality of layer are present, the thickness is a total thickness of the layers) is 5 nm or more and 80 nm or less, and when the plurality of layers are present, the thickness of each layer is 5 nm or more and 50 nm or less.

In a further preferably embodiment, the intermediate layer is $Al_2O_3/SiO_2$, the total thickness thereof is 20 nm or more and 60 nm or less, the thickness of each layer is 10 nm or more and 20 nm or less, preferably 10 nm or more and 15 nm or less.

The method of forming of the intermediate layer is not particularly limited as long as it is a method capable of forming the layer of a metal oxide on the base material, and for example, a deposition method, for example, PVD: Physical Vapor Deposition and CVD: Chemical Vapor Deposition, or the like can be used. Examples of the PVD include, but are not particularly limited to, a vacuum deposition, a sputtering, and the like. The specific examples of the vacuum deposition include resistance heating, electron beam, high-frequency heating using microwave, etc., ion beam, and a similar method. The specific examples of the CVD include plasma-CVD, optical CVD, thermal CVD and a similar method. Among them, the PVD is preferable, in particular, the resistance heating deposition or the electron beam deposition is preferable, and the electron beam deposition is more preferable. By using the PVD, the surface treating layer having higher friction durability can be obtained.

In one embodiment, before forming the surface treating layer on the intermediate layer, a pretreatment of the base material, for example, a cleaning treatment may be performed. By performing the pretreatment, adhesion between the intermediate layer and the surface treating layer is improved, and higher friction durability can be obtained.

The surface treating layer is provided on the intermediate layer. The surface treating layer is formed by using a surface treating agent comprising a fluorine-containing silane compound, and a layer having a perfluoropolyether group on the surface and binding the intermediate layer via a silane portion.

The thickness of the surface treating layer is, but not particularly limited to, preferably 1-50 nm, more preferably 1-30 nm, further more preferably 15-30 nm from the viewpoint of the friction durability.

The fluorine-containing silane compound comprises preferably a perfluoropolyether group and a Si atom having a hydrolyzable group. For example, the fluorine-containing silane compound is one or more compound the following general formulae (A1), (A2), (B1), (B2), (C1), (C2), (D1) and (D2):

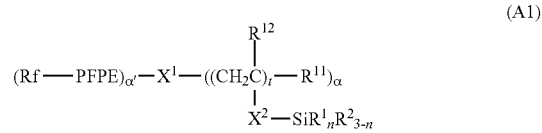
(A1)

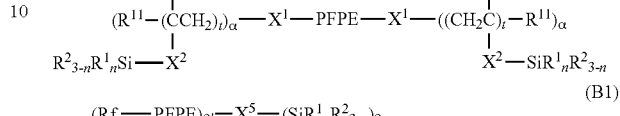
(A2)

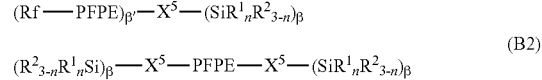
(B1)

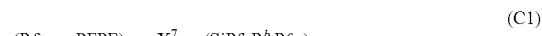
(B2)

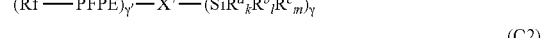
(C1)

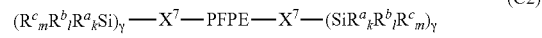
(C2)

(D1)

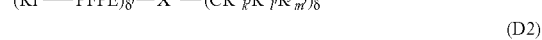
(D2)

wherein:
PFPE is each independently at each occurrence a group of the formula:

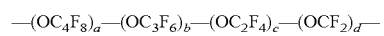

wherein a, b, c and d are each independently an integer of 0-200, the sum of a, b, c and d is at least one, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is, independently per a unit ($-SiR^1_nR^2_{3-n}$), an integer of 0-3;

there is at least one $R^2$ in the formulae (A1), (A2), (B1) and (B2);

$X^1$ is each independently a single bond or a 2-10 valent organic group;

$X^2$ is each independently at each occurrence a single bond or a divalent organic group;

t is each independently at each occurrence an integer of 1-10;

α is each independently an integer of 1-9;

α' is each independently an integer of 1-9;

$X^5$ is each independently a single bond or a 2-10 valent organic group;

β is each independently an integer of 1-9;

β' is an integer of 1-9;

$X^7$ is each independently a single bond or a 2-10 valent organic group;

γ is each independently an integer of 1-9;

γ' is an integer of 1-9;

$R^a$ is each independently at each occurrence $-Z-SiR^{71}_p R^{72}_q R^{73}_r$;

Z is each independently at each occurrence an oxygen atom or a divalent organic group;

$R^{71}$ is each independently at each occurrence $R^{a'}$;

$R^{a'}$ has the same definition as that of $R^a$;

in $R^a$, the number of Si atoms which are straightly linked via the Z group is up to five;

$R^{72}$ is each independently at each occurrence a hydroxyl group or a hydrolyzable group;

$R^{73}$ is each independently at each occurrence a hydrogen atom or a lower alkyl group;

p is each independently at each occurrence an integer of 0-3;

q is each independently at each occurrence an integer of 0-3;

r is each independently at each occurrence an integer of 0-3;

in each $-Z-SiR^{71}_p R^{72}_q R^{73}_r$, the sum of p, q and r is 3, and there is at least one $R^{72}$ in the formula (C1) and (C2);

$R^b$ is each independently at each occurrence a hydroxyl group or a hydrolyzable group;

$R^c$ is each independently at each occurrence a hydrogen atom or a lower alkyl group;

k is each independently at each occurrence an integer of 1-3;

l is each independently at each occurrence an integer of 0-2;

m is each independently at each occurrence an integer of 0-2;

the sum of k, l and m is 3 in each unit in parentheses with the subscript γ;

$X^9$ is each independently a single bond or a 2-10 valent organic group;

δ is each independently an integer of 1-9;

δ' is an integer of 1-9;

$R^d$ is each independently at each occurrence $-Z'-CR^{81}_p R^{82}_q R^{83}_r$;

Z' is each independently at each occurrence an oxygen atom or a divalent organic group;

$R^{81}$ is each independently at each occurrence $R^{d'}$;

$R^{d'}$ has the same definition as that of $R^d$;

in $R^d$, the number of C atoms which are straightly linked via the Z' group is up to five;

$R^{82}$ is each independently at each occurrence $-Y-SiR^{85}_j R^{86}_{3-j}$;

Y is each independently at each occurrence a divalent organic group;

$R^{85}$ is each independently at each occurrence a hydroxyl group or a hydrolyzable group;

$R^{86}$ is each independently at each occurrence a hydrogen atom or a lower alkyl group;

j is an integer of 1-3 independently per unit $-Y-SiR^{85}_j R^{86}_{3-j}$;

$R^{83}$ is each independently at each occurrence a hydrogen atom or a lower alkyl group;

p' is each independently at each occurrence an integer of 0-3;

q' is each independently at each occurrence an integer of 0-3;

r' is each independently at each occurrence an integer of 0-3;

$R^e$ is each independently at each occurrence $-Y-SiR^{85}_j R^{86}_{3-j}$;

$R^f$ is each independently at each occurrence a hydrogen atom or a lower alkyl group;

k' is each independently at each occurrence an integer of 0-3;

l' is each independently at each occurrence an integer of 0-3; and m' is each independently at each occurrence an integer of 0-3;

with the proviso that in the formula at least one q' is 2 or 3, or at least one l' is 2 or 3.

A "hydrocarbon group" as used herein represents a group containing a carbon atom and a hydrogen atom which is obtained by removing a hydrogen atom from a hydrocarbon. Examples of the hydrocarbon group include, but are not particularly limited to, a hydrocarbon group having 1-20 carbon atoms which may be substituted with one or more substituents, for example, an aliphatic hydrocarbon group, an aromatic hydrocarbon group, and the like. The "aliphatic hydrocarbon group" may be straight, branched or cyclic, and may be saturated or unsaturated. The hydrocarbon group may contain one or more ring structures. It is noted that the hydrocarbon group may have one or more N, O, S, Si, amide, sulfonyl, siloxane, carbonyl, carbonyloxy, or the like at its end or in its molecular chain.

As used herein, examples of the substituent of the "hydrocarbon group" include, but are not particularly limited to, for example a halogen atom; and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5-10 membered heterocyclyl group, a 5-10 membered unsaturated heterocyclyl group, a $C_{6-10}$ aryl group, a 5-10 membered heteroaryl group, and the like, which may be substituted by one or more halogen atoms.

A "2-10 valent organic group" as used herein represents a 2-10 valent group containing a carbon atom. Examples of the 2-10 valent organic group include, but are not particularly limited to, a 2-10 valent group obtained by removing 1-9 hydrogen atoms from a hydrocarbon group. For example, examples of the divalent organic group include, but are not particularly limited to, a divalent group obtained by removing one hydrogen atom from a hydrocarbon group from a hydrocarbon group.

Hereinafter, the perfluoropolyether group containing silane compound of the formulae (A1), (A2), (B1), (B2), (C1), (C2), (D1) and (D2) will be described.

Formulae (A1) and (A2):

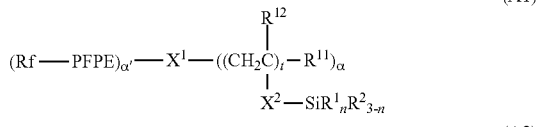

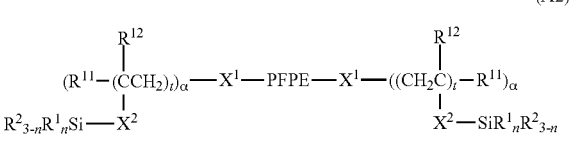

In the formula, PFPE is $-(OC_4F_8)_a-(OC_3F_6)_b-(OC_2F_4)_c-(OCF_2)_d-$, and corresponds to a perfluoropolyether group. Herein, a, b, c and d are each independently 0 or an integer of 1 or more. The sum of a, b, c and d is 1 or more. Preferably, a, b, c and d are each independently an integer of 0 or more and 200 or less, for example an integer of 1 or more and 200 or less, more preferably each independently an integer of 0 or more and 100 or less. The sum of a, b, c and d is preferably 5 or more, more preferably 10 or more, for example 10 or more and 100 or less. The occurrence order of the respective repeating units in parentheses with the subscript a, b, c or d is not limited in the formula. Among these repeating units, the —(OC$_4$F$_8$)— group may be any of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, preferably —(OCF$_2$CF$_2$CF$_2$CF$_2$)—. The —(OC$_3$F$_6$)— group may be any of —(OCF$_2$CF$_2$CF$_2$)—, —(OCF(CF$_3$)CF$_2$)— and —(OCF$_2$CF(CF$_3$))—, preferably —(OCF$_2$CF$_2$CF$_2$)—. The —(OC$_2$F$_4$)— group may be any of —(OCF$_2$CF$_2$)— and —(OCF(CF$_3$))—, preferably —(OCF$_2$CF$_2$)—.

In one embodiment, PFPE is —(OC$_3$F$_6$)$_b$— wherein b is an integer of 1 or more and 200 or less, preferably 5 or more and 200 or less, more preferably 10 or more and 200 or less, preferably —(OCF$_2$CF$_2$CF$_2$)$_b$— wherein b is an integer of 1 or more and 200 or less, preferably 5 or more and 200 or less, more preferably 10 or more and 200 or less, or —(OCF(CF$_3$)CF$_2$)$_b$— wherein b is an integer of 1 or more and 200 or less, preferably 5 or more and 200 or less, more preferably 10 or more and 200 or less, more preferably —(OCF$_2$CF$_2$CF$_2$)$_b$— wherein b is an integer of 1 or more and 200 or less, preferably 5 or more and 200 or less, more preferably 10 or more and 200 or less.

In another embodiment, PFPE is —(OC$_4$F$_8$)$_a$—(OC$_3$F$_6$)$_b$—(OC$_2$F$_4$)$_c$—(OCF$_2$)$_d$— wherein a and b are each independently an integer of 0 or more and 30 or less, c and d are each independently an integer of 1 or more and 200 or less, preferably 5 or more and 200 or less, more preferably 10 or more and 200 or less, and the occurrence order of the respective repeating units in parentheses with the subscript a, b, c or d is not limited in the formula; preferably —(OCF$_2$CF$_2$CF$_2$CF$_2$)$_a$—(OCF$_2$CF$_2$CF$_2$)$_b$—(OCF$_2$CF$_2$)$_c$—(OCF$_2$)$_d$—. In one embodiment, PFPE may be —(OC$_2$F$_4$)$_c$—(OCF$_2$)$_d$— wherein c and d are each independently an integer of 1 or more and 200 or less, preferably 5 or more and 200 or less, more preferably 10 or more and 200 or less, and the occurrence order of the respective repeating units in parentheses with the subscript c or d is not limited in the formula.

In further another embodiment, PFPE is a group of —(R$^{19}$-R$^8$)$_{n''}$—. In the formula, R$^{19}$ is OCF$_2$ or OC$_2$F$_4$, preferably OC$_2$F$_4$. In the formula, R$^{18}$ is a group selected from OC$_2$F$_4$, OC$_3$F$_6$, OC$_4$F$_8$, OC$_5$F$_{10}$ and OC$_6$F$_{12}$, or a combination of two or three groups independently selected them. Preferably, R$^{18}$ is a group selected from OC$_2$F$_4$, OC$_3$F$_6$ and OC$_4$F$_8$, or a combination of two or three groups independently selected them. Preferably, PFPE is a group of —(OC$_2$F$_4$—R$^{18}$)$_{n''}$—. In the formula, R$^{18}$ is a group selected form OC$_2$F$_4$, OC$_3$F$_6$ and OC$_4$F$_8$ or a combination of two or three groups independently selected them. Examples of the combination of 2 or 3 groups independently selected from OC$_2$F$_4$, OC$_3$F$_6$ and OC$_4$F$_8$ include, but not particularly limited to, for example, —OC$_2$F$_4$OC$_3$F$_6$—, —OC$_2$F$_4$OC$_4$F$_8$—, —OC$_3$F$_6$OC$_2$F$_4$—, —OC$_3$F$_6$OC$_3$F$_6$—, —OC$_3$F$_6$OC$_4$F$_8$—, —OC$_4$F$_8$OC$_4$F$_8$—, —OC$_4$F$_8$OC$_3$F$_6$—, —OC$_4$F$_8$OC$_2$F$_4$—, —OC$_2$F$_4$OC$_2$F$_4$OC$_3$F$_6$—, —OC$_2$F$_4$OC$_2$F$_4$OC$_4$F$_8$—, —OC$_2$F$_4$OC$_3$F$_6$OC$_2$F$_4$—, —OC$_2$F$_4$OC$_3$F$_6$OC$_3$F$_6$—, —OC$_2$F$_4$OC$_4$F$_8$OC$_2$F$_4$—, —OC$_3$F$_6$OC$_2$F$_4$OC$_2$F$_4$—, —OC$_3$F$_6$OC$_2$F$_4$OC$_3$F$_6$—, —OC$_3$F$_6$OC$_3$F$_6$OC$_2$F$_4$—, and —OC$_4$F$_8$OC$_2$F$_4$OC$_2$F$_4$—, and the like. n'' is an integer of 2-100, preferably an integer of 2-50. In the above-mentioned formula, OC$_2$F$_4$, OC$_3$F$_6$ and OC$_4$F$_8$ may be straight or branched, preferably straight.

In this embodiment, PFPE is preferably —(OC$_2$F$_4$—OC$_3$F$_6$)$_{n''}$— or —(OC$_2$F$_4$—OC$_4$F$_8$)$_{n''}$—.

In the formula, Rf is an alkyl group having 1-16 carbon atoms which may be substituted by one or more fluorine atoms.

The "alkyl group having 1-16 carbon atoms" in the alkyl having 1-16 carbon atoms which may be substituted by one or more fluorine atoms may be straight or branched, and preferably is a straight or branched alkyl group having 1-6 carbon atoms, in particular 1-3 carbon atoms, more preferably a straight alkyl group having 1-3 carbon atoms.

Rf is preferably an alkyl having 1-16 carbon atoms substituted by one or more fluorine atoms, more preferably a CF$_2$H—C$_{1-15}$ fluoroalkylene group, more preferably a perfluoroalkyl group having 1-16 carbon atoms.

The perfluoroalkyl group having 1-16 carbon atoms may be straight or branched, and preferably is a straight or branched perfluoroalkyl group having 1-6 carbon atoms, in particular 1-3 carbon atoms, more preferably a straight perfluoroalkyl group having 1-3 carbon atoms, specifically —CF$_3$, —CF$_2$CF$_3$ or —CF$_2$CF$_2$CF$_3$.

In the formula, R$^1$ is each independently at each occurrence a hydrogen atom or an alkyl group having 1-22 carbon atoms preferably an alkyl group having 1-4 carbon atoms.

In the formula, R$^2$ is each independently at each occurrence a hydroxyl group or a hydrolyzable group.

The "hydrolyzable group" as used herein represents a group which is able to be removed from a backbone of a compound by a hydrolysis reaction. Examples of the hydrolyzable group include —OR, —OCOR, —O—N=CR$_2$, —NR$_2$, —NHR, halogen (wherein R is a substituted or non-substituted alkyl group having 1-4 carbon atoms), preferably —OR (i.e. an alkoxy group). Examples of R include a non-substituted alkyl group such as a methyl group, an ethyl group, a propyl group, an isopropyl group, an n-butyl group, an isobutyl group; and a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

In the formula, R$^{11}$ is each independently at each occurrence a hydrogen atom or a halogen atom. The halogen atom is preferably an iodine atom, a chlorine atom, a fluorine atom, more preferably a fluorine atom.

In the formula, R$^{12}$ is each independently at each occurrence a hydrogen atom or a lower alkyl group. The lower alkyl group is preferably an alkyl group having 1-20 carbon atoms, more preferably an alkyl group having 1-6 carbon atoms, for example a methyl group, an ethyl group, an propyl group, or the like.

In the formula, n is, independently per a unit (—SiR$^1_n$R$^2_{3-n}$), an integer of 0-3, preferably 0-2, more preferably 0. All of n are not simultaneously 0 in the formula. In other words, at least one R$^2$ is present in the formula.

In the formula, X$^1$ is each independently a single bond or a 2-10 valent organic group. X$^1$ is recognized to be a linker which connects between a perfluoropolyether moiety (i.e., an Rf-PFPE moiety or -PFPE-moiety) providing mainly water-repellency, surface slip property and the like and a silane moiety (i.e., a group in parentheses with the subscript a) providing an ability to bind to a base material in the compound of the formula (A1) and (A2). Therefore, X$^1$ may be any organic group as long as the compound of the formula (A1) and (A2) can stably exist.

In the formula, a is an integer of 1-9, and α' is an integer of 1-9. α and α' may be varied depending on the valence number of the $X^1$ group. In the formula (A1), the sum of $\alpha$ and $\alpha'$ is the valence number of $X^1$. For example, when $X^1$ is a 10 valent organic group, the sum of $\alpha$ and $\alpha'$ is 10, for example, $\alpha$ is 9 and $\alpha'$ is 1, $\alpha$ is 5 and $\alpha'$ is 5, or a is 1 and $\alpha'$ is 9. When $X^1$ is a divalent organic group, $\alpha$ and $\alpha'$ are 1. In the formula (A2), $\alpha$ is a value obtained by subtracting 1 from the valence number of $X^1$.

$X^1$ is preferably a 2-7 valent, more preferably 2-4 valent, more preferably a divalent organic group.

In one embodiment, $X^1$ is a 2-4 valent organic group, $\alpha$ is 1-3, and $\alpha'$ is 1.

In another embodiment, $X^1$ is a divalent organic group, $\alpha$ is 1, and $\alpha'$ is 1. In this case, the formulae (A1) and (A2) are represented by the following formulae (A1') and (A2').

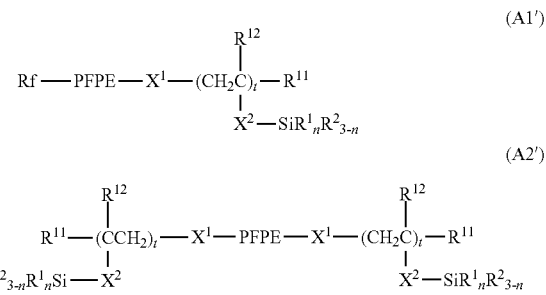

Examples of $X^1$ include, but are not particularly limited to, for example a divalent group of the following formula:

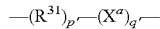

wherein:
$R^{31}$ is a single bond, —$(CH_2)_{s'}$— or an o-, m- or p-phenylene group, preferably —$(CH_2)_{s'}$—, s' is an integer of 1-20, preferably an integer of 1-6, more preferably an integer of 1-3, further more preferably 1 or 2, $X^a$ is —$(X^b)_{l'}$—, $X^b$ is each independently at each occurrence a group selected from the group consisting of —O—, —S—, an o-, m- or p-phenylene group, —C(O)O—, —Si$(R^{33})_2$—, —(Si$(R^{33})_2$O)$_{m'}$—Si$(R^{33})_2$—, —CONR$^{34}$—, —O—CONR$^{34}$—, —NR$^{34}$— and —$(CH_2)_{n'}$—, $R^{33}$ is each independently at each occurrence a phenyl group, a $C_{1-6}$ alkyl group or a $C_{1-6}$ alkoxy group, preferably a phenyl group or a $C_{1-6}$ alkyl group, more preferably a methyl group, $R^{34}$ is each independently at each occurrence a hydrogen atom, a phenyl group or a $C_{1-6}$ alkyl group (preferably a methyl group), m' is each independently at each occurrence an integer of 1-100, preferably an integer of 1-20, n' is each independently at each occurrence an integer of 1-20, preferably an integer of 1-6, more preferably an integer of 1-3, l' is an integer of 1-10, preferably an integer of 1-5, more preferably an integer of 1-3, p' is 0 or 1, q' is 0 or 1, and at least one of p' and q' is 1, and the occurrence order of the respective repeating units in parentheses with the subscript p' or q' is not limited in the formula. Here, $R^{31}$ and $X^a$ (typically, a hydrogen atom in $R^{31}$ and $X^a$) may be substituted with one or more substituents selected from a fluorine atom, a $C_{1-3}$ alkyl group and a $C_{1-3}$ fluoroalkyl group.

Preferably, $X^1$ is —$(R^{31})_{p'}$—$(X^a)_{q'}$—$R^{32}$—. $R^{32}$ is a single bond, —$(CH_2)_{t'}$— or an o-, m- or p-phenylene group, preferably —$(CH_2)_{t'}$—. t' is an integer of 1-20, preferably an integer of 2-6, more preferably an integer of 2-3. Here, $R^{32}$ (typically, a hydrogen atom in $R^{32}$) may be substituted with one or more substituents from a fluorine atom, a $C_{1-3}$ alkyl group and a $C_{1-3}$ fluoroalkyl group.

Preferably, $X^1$ may be
a $C_{1-20}$ alkylene group,
—$R^{31}$—$X^c$—$R^{32}$—, or
—$X^d$—$R^{32}$—
wherein $R^{31}$ and $R^{32}$ are as defined above.

More preferably, $X^1$ may be
a $C_{1-20}$ alkylene group,
—$(CH_2)_{s'}$—$X^c$—,
—$(CH_2)_{s'}$—$X^c$—$(CH_2)_{t'}$—
—$X^d$—, or
—$X^d$—$(CH_2)_{t'}$—
wherein s' and t' are as defined above.

In the formula, $X^c$ is
—O—,
—S—,
—C(O)—,
—CONR$^{34}$—,
—O—CONR$^{34}$—,
—Si$(R^{33})_2$—,
—(Si$(R^{33})_2$O)$_{m'}$—Si$(R^{33})_2$—,
—O—$(CH_2)_{u'}$—(Si$(R^{33})_2$O)$_{m'}$—Si$(R^{33})_2$—,
—O—$(CH_2)_{u'}$—Si$(R^{33})_2$—O—Si$(R^{33})_2$—CH$_2$CH$_2$—Si$(R^{33})_2$—O—Si$(R^{33})_2$—,
—O—$(CH_2)_{u'}$—Si(OCH$_3$)$_2$OSi(OCH$_3$)$_2$—,
—CONR$^{34}$—$(CH_2)_{u'}$—(Si$(R^{33})_2$O)$_{m'}$—Si$(R^{33})_2$—,
—CONR$^{34}$—$(CH_2)_{u'}$—N($R^{34}$)—, or
—CONR$^{34}$-(o-, m- or p-phenylene)-Si$(R^{33})_2$—
wherein $R^{33}$, $R^{34}$ and m' are as defined above, and u' is an integer of 1-20, preferably an integer of 2-6, more preferably an integer of 2-3. $X^c$ is preferably —O—.

In the formula, $X^d$ is
—S—,
—C(O)O—,
—CONR$^{34}$—,
—CONR$^{34}$—$(CH_2)_{u'}$—(Si$(R^{33})_2$O)$_{m'}$—Si$(R^{33})_2$—,
—CONR$^{34}$—$(CH_2)_{u'}$—N($R^{34}$)—, or
—CONR$^{34}$-(o-, m- or p-phenylene)-Si$(R^{33})_2$—
wherein each of symbols is as defined above.

more preferably, $X^1$ is
a $C_{1-20}$ alkylene group,
—$(CH_2)_{s'}$—$X^c$—$(CH_2)_{t'}$—, or
—$X^d$—$(CH_2)_{t'}$—
wherein each of symbols is as defined above.

Further more preferably, $X^1$ is
a $C_{1-20}$ alkylene group,
—$(CH_2)_{s'}$—O—$(CH_2)_{t'}$—,
—$(CH_2)_{s'}$—(Si$(R^{33})_2$O)$_{m'}$—Si$(R^{33})_2$—$(CH_2)_{t'}$—,
—$(CH_2)_{s'}$—O—$(CH_2)_{u'}$—(Si$(R^{33})_2$O)$_{m'}$—Si$(R^{33})_2$—$(CH_2)_{t'}$—, or
—$(CH_2)_{s'}$—O—$(CH_2)_{t'}$—Si$(R^{33})_2$—$(CH_2)_{u'}$—Si$(R^{33})_2$—$(C_vH_{2v})$—
wherein $R^{33}$, m', s', t' and u' are as defined above, and v is an integer of 1-20, preferably an integer of 2-6, more preferably an integer of 2-3.

In the formula, —$(C_vH_{2v})$— may be straight or branched, for example, may be, for example, —CH$_2$CH$_2$—, —CH$_2$CH$_2$CH$_2$—, —CH(CH$_3$)—, —CH(CH$_3$)CH$_2$—.

$X^1$ may be substituted with one or more substituents selected from a fluorine atom, a $C_{1-3}$ alkyl group and a $C_{1-3}$ fluoroalkyl group (preferably, a $C_{1-3}$ perfluoroalkyl group).

In one embodiment, $X^1$ may be a group other than —O—$C_{1-6}$ alkylene group.

In another embodiment, examples of $X^1$ include, for example, the following groups:

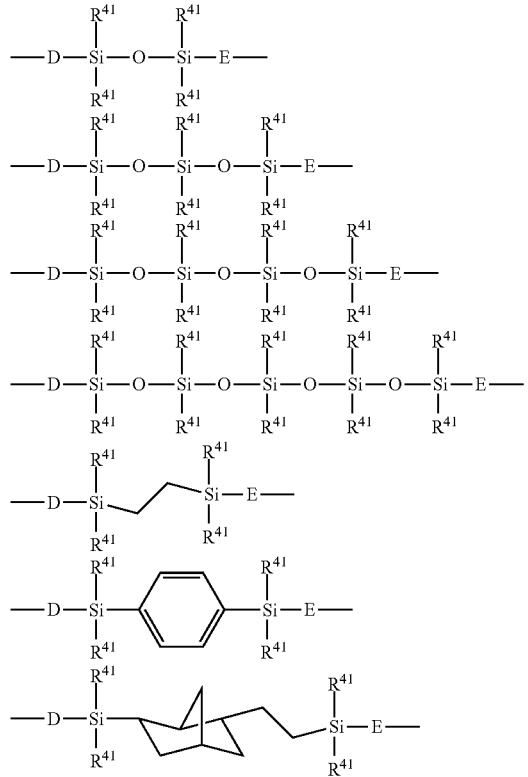

wherein $R^{41}$ is each independently a hydrogen atom, a phenyl group, an alkyl group having 1-6 carbon atoms, or a $C_{1-6}$ alkoxy group, preferably a methyl group;

D is a group selected from:
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$— (wherein Ph is a phenyl group), and

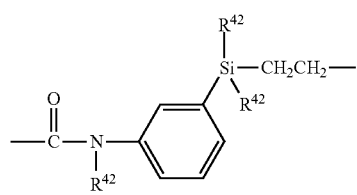

wherein $R^{42}$ is each independently a hydrogen atom, a $C_{1-6}$ alkyl group, or a $C_{1-6}$ alkoxy group, preferably a methyl group or a methoxy group, more preferably a methyl group, E is —$(CH_2)_n$— wherein n is an integer of 2-6, and D binds to PFPE of the main backbone, and E binds to a group opposite to PFPE.

Specific examples of $X^1$ include, for example:
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(C_3)_2O(S(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—
—$CH_2OCH_2$ $(CH_2)_7CH_2Si(OCH_3)_2OSi(OCH_3)_2(CH_2)_2Si(OCH_3)_2OSi(CH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—,
—$(CH_2)_3$—,
—$(CH_2)_4$—,
—$(CH_2)_5$—,
—$(CH_2)_6$—,
—CONH—$(CH_2)_3$—,
—CON($CH_3$)—$(CH_2)_3$—,
—CON(Ph)-$(CH_2)_3$— (wherein Ph is phenyl),
—CONH—$(CH_2)_6$—,
—CON($CH_3$)—$(CH_2)_6$—,
—CON(Ph)-$(CH_2)_6$— (wherein Ph is phenyl),
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2(CH_2)_2$—,
—CONH—$(CH_2)_3Si(CH_2)_2O(Si((CH_3)_2O)_{10}Si(CH_3)_2(CH_2)_2$—,
—CONH—$(CH_2)_3Si(CH_3)_2O(Si(CH_3)_2O)_{20}Si(CH_3)_2(CH_2)_2$—
—C(O)O—$(CH_2)_3$—,
—C(O)—$(CH_2)_6$—,
—$CH_2$—O—$(CH_2)_3$—Si($CH_3$)$_2$—$(CH_2)_2$—Si($CH_3$)$_2$—$(CH_2)_2$—, —CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—
—OCFHCF$_2$—,

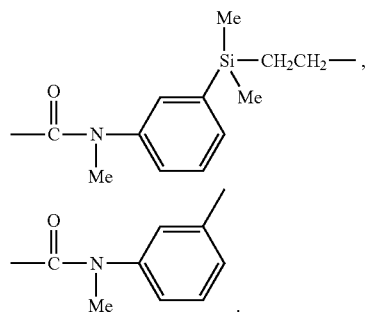

In another preferable embodiment, $X^1$ is a group of the formula: —(R$^{16}$)$_x$—(CFR$^{17}$)$_y$—(CH$_2$)$_z$—. In the formula, x, y and z are each independently an integer of 0-10, the sum of x, y and z is 1 or more, and the occurrence order of the respective repeating units in parentheses is not limited in the formula.

In the formula, $R^{16}$ is each independently at each occurrence an oxygen atom, phenylene, carbazolylene, —NR$^{26}$— (wherein $R^{26}$ is a hydrogen atom or an organic group) or a divalent organic group. Preferably, $R^{16}$ is an oxygen atom or a divalent polar group.

Examples of the "divalent polar group" include, but are not particularly limited to, —C(O)—, —C(=NR$^{27}$)—, and —C(O)NR$^{27}$— wherein $R^{27}$ is a hydrogen atom or a lower alkyl group. The "lower alkyl group" is, for example, an alkyl group having 1-6 carbon atoms, for example, methyl, ethyl, n-propyl, which may be substituted by one or more fluorine atoms.

In the formula, $R^{17}$ is each independently at each occurrence a hydrogen atom, a fluorine atom or a lower fluoroalkyl group, preferably a fluorine atom. The "lower fluoroalkyl group" is, for example, preferably a fluoroalkyl group having 1-6 carbon atoms, preferably 1-3 carbon atoms, preferably a perfluoroalkyl group having 1-3 carbon atoms, more preferably a trifluoromethyl group, and a pentafluoroethyl group, further preferably a trifluoromethyl group.

In this embodiment, $X^1$ is preferably is a group of the formula: —(O)$_x$—(CF$_2$)$_y$—(CH$_2$)$_z$— wherein x, y and z are as defined above, and the occurrence order of the respective repeating units in parentheses is not limited in the formula.

Examples of the group of the formula: —(O)$_x$—(CF$_2$)$_y$—(CH$_2$)$_z$— include, for example, —(O)$_x$—(CH$_2$)$_{z''}$—O—[(CH$_2$)$_{z'''}$—O—]$_{z''''}$, and —(O)$_{x'}$—(CF$_2$)$_{y''}$—(CH$_2$)$_{z''}$—O—[(CH$_2$)$_{z'''}$—O—]$_{z''''}$ wherein x' is 0 or 1, y", z" and z"' are each independently an integer of 1-10, and z"" is 0 or 1. It is noted that these groups are attached to PFPE at its left side terminal.

In another preferable embodiment, $X^1$ is —O—CFR$^{13}$—(CF$_2$)$_e$—.

$R^{13}$ is each independently a fluorine atom or a lower fluoroalkyl group. The lower fluoroalkyl group is, for example, a fluoroalkyl group having 1-3 carbon atoms, preferably a perfluoroalkyl group having 1-3 carbon atoms, more preferably a trifluoromethyl group, and a pentafluoroethyl group, further preferably a trifluoromethyl group.

e is each independently 0 or 1.

In one embodiment, $R^{13}$ is a fluorine atom, and e is 1.

In another embodiment, examples of $X^1$ include the following groups:

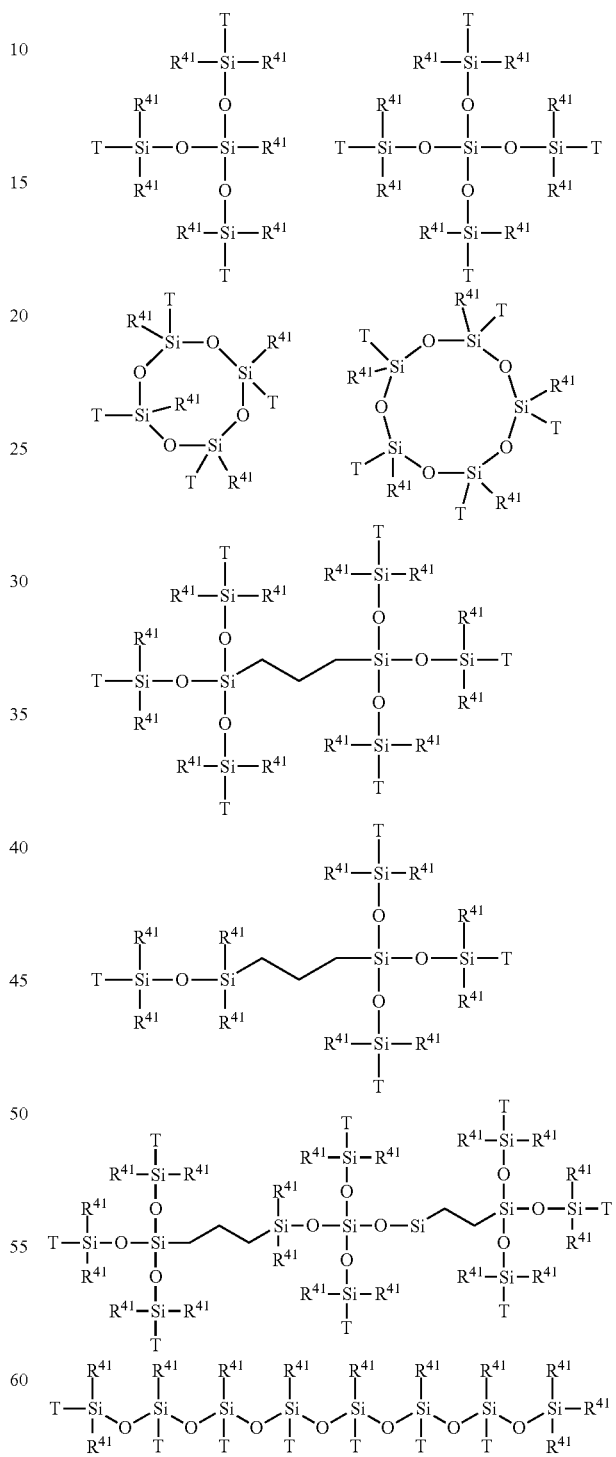

wherein $R^{41}$ is each independently a hydrogen atom, a phenyl group, an alkyl group having 1-6 carbon atoms, or a $C_{1-6}$ alkoxy group, preferably a methyl group;

in each X¹, some of T are a following group which binds to PFPE of the main backbone:
—CH₂O(CH₂)₂—,
—CH₂O(CH₂)₃—,
—CF₂O(CH₂)₃—,
—(CH₂)₂—,
—(CH₂)₃—,
—(CH₂)₄—,
—CONH—(CH₂)₃—,
—CON(CH₃)—(CH₂)₃—,
—CON(Ph)-(CH₂)₃— (wherein Ph is phenyl), or

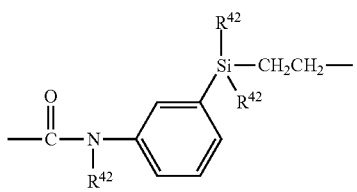

wherein R⁴² is each independently a hydrogen atom, a C$_{1-6}$ alkyl group, or a C$_{1-6}$ alkoxy group, preferably a methyl group or a methoxy group, more preferably a methyl group, some of the other T are —(CH₂)$_{n''}$— (wherein n'' is an integer of 2-6) attached to the group opposite to PFPE which is a molecular backbone (i.e., a carbon atom in the formulae (A1) and (A2), and a Si atom in the formulae (B1), (B2), (C1) and (C2)), and the others T are each independently a methyl group, a phenyl group, or a C$_{1-6}$ alkoxy or a radical scavenger group or an ultraviolet ray absorbing group, if present.

The radical scavenger group is not limited as long as it can trap a radical generated by light irradiation, and includes, for example, a residue of benzophenones, benzotriazoles, benzoic esters, phenyl salicylates, crotonic acids, malonic esters, organoacrylates, hindered amines, hindered phenols, or triazines.

The ultraviolet ray absorbing group is not limited as long as it can absorb an ultraviolet ray, and includes, for example, benzotriazoles, hydroxybenzophenones, esters of benzoic acid or salicylic acid, acrylates, alkoxycinnamates, oxamides, oxanilides, benzoxazinones, or benzoxazoles.

In a preferable embodiment, examples of the radical scavenger group or the ultraviolet ray absorbing group include:

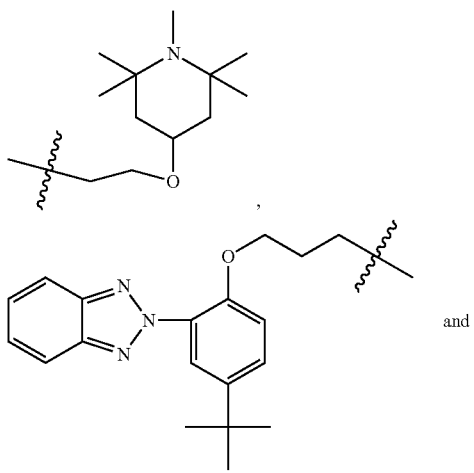

and

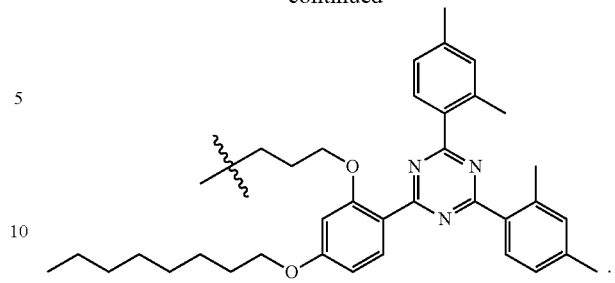

In this embodiment, X¹, X⁵ and X⁷ may be each independently a 3-10 valent organic group.

In the formula, t is each independently an integer of 1-10. In a preferable embodiment, t is an integer of 1-6.

In another preferable embodiment, t is an integer of 2-10, preferably an integer of 2-6.

In the formula, X² is each independently at each occurrence a single bond or a divalent organic group. X² is preferably an alkylene group having 1-20 carbon atoms, more preferably —(CH₂)$_u$— wherein u is an integer of 0-2.

The preferable compound of the formulae (A1) and (A2) is a compound of the formula (A1') and (A2'):

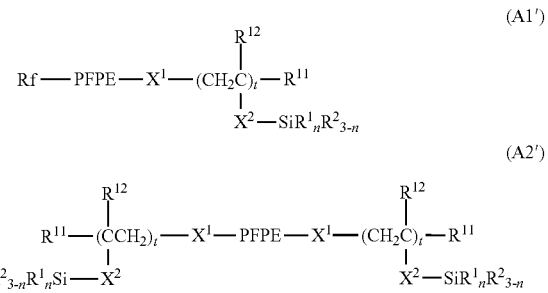

wherein:

PFPE is each independently a group of the formula:
—(OC₄F₈)$_a$—(OC₃F₆)$_b$—(OC₂F₄)$_c$—(OCF₂)$_d$—
wherein a, b, c and d are each independently an integer of 0-200, the sum of a, b, c and d is one or more, and the occurrence order of the respective repeating units in parentheses with the subscript a, b, c or d is not limited in the formula, Rf is each independently at each occurrence an alkyl group having 1-16 carbon atoms which may be substituted by one or more fluorine atoms;

R¹ is each independently at each occurrence a hydrogen atom or an alkyl group having 1-22 carbon atoms;

R² is each independently at each occurrence a hydroxyl group or a hydrolyzable group;

R¹¹ is each independently at each occurrence a hydrogen atom or a halogen atom;

R¹² is each independently at each occurrence a hydrogen atom or a lower alkyl group;

n is an integer of 0-2, preferably 0;

X¹ is —O—CFR¹³—(CF₂)$_e$—;

R¹³ is a fluorine atom or a lower fluoroalkyl group;

e is 0 or 1;

X² is —(CH₂)$_u$—;

u is an integer of 0-2; and t is an integer of 1-10.

The compound of the formulae (A1) and (A2) can be obtained for example by introducing an iodine into in the end of a perfluoropolyether derivative corresponding to the Rf-PFPE moiety as a raw material, and then reacting it with a vinyl monomer corresponding to —CH$_2$CR$^{12}$ (X$^2$—SiR$^1{}_n$R$^2{}_{3-n}$)—.

Formulae (B1) and (B2):

(Rf-PFPE)$_{\beta'}$-X$^5$—(SiR$^1{}_n$R$^2{}_{3-n}$)$_\beta$ (B1)

(R$^2{}_{3-n}$R$^1{}_n$Si)$_\beta$—X$^5$-PFPE-X$^5$—(SiR$^1{}_n$R$^2{}_{3-n}$) (B2)

In the formulae (B1) and (B2), Rf, PFPE, R$^1$, R$^2$ and n are as defined above for the formulae (A1) and (A2).

In the formula, X$^5$ is each independently a single bond or a 2-10 valent organic group. X$^5$ is recognized to be a linker which connects between a perfluoropolyether moiety (i.e., an Rf-PFPE moiety or -PFPE-moiety) providing mainly water-repellency, surface slip property and the like and a silane moiety (specifically, —SiR$^1{}_n$R$^2{}_{3-n}$) providing an ability to bind to a base material in the compound of the formulae (B1) and (B2). Therefore, X$^5$ may be any organic group as long as the compound of the formula (B1) and (B2) can stably exist.

In the formula, 3 is an integer of 1-9, and β' is an integer of 1-9. β and β' may be determined depending on the valence number of X$^5$, and in the formula (B1), the sum of β and β' is the valence number of X$^5$. For example, when X$^5$ is a 10 valent organic group, the sum of 3 and β' is 10, for example, β is 9 and β' is 1, β is 5 and β' is 5, or β is 1 and β' is 9. When X$^5$ is a divalent organic group, β and β' are 1. In the formula (B2), β is a value obtained by subtracting 1 from the valence number of X$^5$.

X$^5$ is preferably a 2-7 valent, more preferably a 2-4 valent, further preferably a divalent organic group.

In one embodiment, X$^5$ is a 2-4 valent organic group, β is 1-3, and β' is 1.

In another embodiment, X$^5$ is a divalent organic group, β is 1, and β' is 1. In this case, the formulae (B1) and (B2) are represented by the following formulae (B1') and (B2').

(Rf-PFPE)-X$^5$—SiR$^1{}_n$R$^2{}_{3-n}$ (B1')

(R$^2{}_{3-n}$R$^1{}_n$Si—X$^5$-PFPE-X$^5$—SiR$^1{}_n$R$^2{}_{3-n}$ (B2')

Examples of X$^5$ include, but are not particularly limited to, for example, the same group as those described for X$^1$.

Among them, a preferable specific embodiment of X$^5$ includes:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCH$_2$ (CH$_2$)$_7$CH$_2$Si(OCH$_3$)$_2$OSi(OCH$_3$)$_2$(CH$_2$)$_2$Si(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$Si(OCH$_2$CH$_3$)$_2$(CH$_2$)$_2$—,
—(CH$_2$)$_2$—,
—(CH$_2$)$_3$—
—(CH$_2$)$_4$—,
—(CH$_2$)$_5$—
—(CH$_2$)$_6$—,
—CONH—(CH$_2$)$_3$—,
—CON(CH$_3$)—(CH$_2$)$_3$—,
—CON(Ph)-(CH$_2$)$_3$— (wherein Ph is phenyl),
—CONH—(CH$_2$)$_6$—,
—CON(CH$_3$)—(CH$_2$)$_6$—,
—CON(Ph)-(CH$_2$)$_6$— (wherein Ph is phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$Si(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(C$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

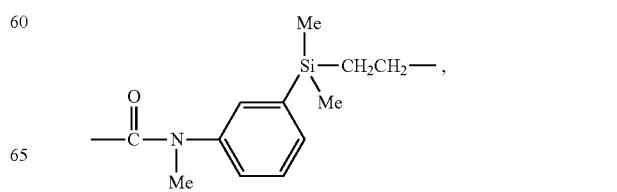

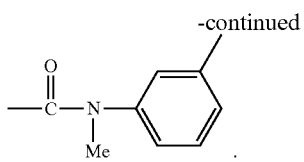

The preferable compound of the formulae (B1) and (B2) is a compound of the formula (B1') and (B2'):

$$(Rf\text{-}PFPE)\text{-}X^5\text{—}SiR^1{}_nR^2{}_{3-n} \quad (B1')$$

$$(R^2{}_{3-n}R^1{}_nSi\text{—}X^5\text{-}PFPE\text{-}X^5\text{—}SiR^1{}_nR^2{}_{3-n}) \quad (B2')$$

wherein:

PFPE is each independently a group of the formula:

$$—(OC_4F_8)_a—(OC_3F_6)_b—(OC_2F_4)_c—(OCF_2)_d—$$

wherein a, b, c and d are each independently an integer of 0-200, the sum of a, b, c and d is one or more, and the occurrence order of the respective repeating units in parentheses with the subscript a, b, c or d is not limited in the formula, Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

n is an integer of 0-2, preferably 0; and $X^5$ is —$CH_2O(CH_2)_2$—, —$CH_2O(CH_2)_3$— or —$CH_2O(CH_2)_6$—.

The compound of the formulae (B1) and (B2) can be prepared by a known method, for example, a method described in Patent Document 1 or the modified method thereof.

Formulae (C1) and (C2):

$$(Rf\text{-}PFPE)_\gamma\text{-}X^7\text{—}(SiR^a{}_kR^b{}_lR^c{}_m)_{\gamma'} \quad (C1)$$

$$(R^c{}_mR^b{}_lR^a{}_kSi)_{\gamma'}\text{—}X^7\text{-}PFPE\text{-}X^7\text{—}(SiR^a{}_kR^b{}_lR^c{}_m)_{\gamma'} \quad (C2)$$

In the formulae (C1) and (C2), Rf and PFPE are as defined for the formulae (A1) and (A2).

In the formula, $X^7$ is each independently a single bond or a 2-10 valent organic group. $X^7$ is recognized to be a linker which connects between a perfluoropolyether moiety (an Rf-PFPE moiety or -PFPE-moiety) providing mainly water-repellency, surface slip property and the like and a silane moiety (specifically, —$SiR^a{}_kR^b{}_lR^c{}_m$) providing an ability to bind to a base material in the compound of the formula (C1) and (C2). Therefore, $X^7$ may be any organic group as long as the compound of the formula (C1) and (C2) can stably exist.

In the formula, $\gamma$ is an integer of 1-9, and $\gamma'$ is an integer of 1-9. $\gamma$ and $\gamma'$ may be determined depending on the valence number of $X^7$, and in the formula (C1), the sum of $\gamma$ and $\gamma'$ is the valence number of $X^7$. For example, when $X^7$ is a 10 valent organic group, the sum of $\gamma$ and $\gamma'$ is 10, for example, $\gamma$ is 9 and $\gamma'$ is 1, $\gamma$ is 5 and $\gamma'$ is 5, or $\gamma$ is 1 and $\gamma'$ is 9. When $X^7$ is a divalent organic group, $\gamma$ and $\gamma'$ are 1. In the formula (C1), $\gamma$ is a value obtained by subtracting 1 from the valence number of $X^7$.

$X^7$ is preferably a 2-7 valent, more preferably a 2-4 valent, further preferably a divalent organic group.

In one embodiment, $X^7$ is a 2-4 valent organic group, $\gamma$ is 1-3, and $\gamma'$ is 1.

In another embodiment, $X^7$ is a divalent organic group, $\gamma$ is 1, and $\gamma'$ is 1. In this case, the formulae (C1) and (C2) are represented by the following formulae (C1') and (C2').

$$Rf\text{-}PFPE\text{-}X^7\text{—}SiR^a{}_kR^b{}_lR^c{}_m \quad (C1')$$

$$R^c{}_mR^b{}_lR^a{}_kSi\text{—}X^7\text{-}PFPE\text{-}X^7\text{—}SiR^a{}_kR^b{}_lR^c{}_m \quad (C2')$$

Examples of $X^7$ include, but are not particularly limited to, for example, the same groups as those described for $X^1$.

Among them, a preferable specific embodiment of $X^7$ includes:

—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$— $CH_2OCH_2$ $(CH_2)_7CH_2Si(OCH_3)_2OSi(OCH_3)_2$ $(CH_2)_2Si(OCH_3)_2OSi(OCH_3)_2$ $(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$(CH_2)_2$—,
—$(CH_2)_3$—,
—$(CH_2)_4$—,
—$(CH_2)_5$—,
—$(CH_2)_6$—,
—$CONH$—$(CH_2)_3$—,
—$CON(CH_3)$—$(CH_2)_3$—,
—$CON(Ph)$-$(CH_2)_3$— (wherein Ph is phenyl),
—$CONH$—$(CH_2)_6$—,
—$CON(CH_3)$—$(CH_2)_6$—,
—$CON(Ph)$-$(CH_2)_6$— (wherein Ph is phenyl),
—$CONH$—$(CH_2)_2NH(CH_2)_3$—,
—$CONH$—$(CH_2)_6NH(CH_2)_3$—,
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$—,
—$CONH$—$(CH_2)_3Si(CH_3)_2OSi(CH_3)_2(CH_2)_2$—,
—$CONH$—$(CH_2)_3Si(CH_3)_2OSi(CH_3)_2Si(CH_3)_2(CH_2)_2$—,
—$CONH$—$(CH_2)_3Si(CH_3)_2O(Si(CH_3)_2O)_2Si(CH_3)_2(CH_2)_2$—, —CONH—$(CH_2)_3Si(CH_3)_2O(Si(CH_3)_2O)_3Si(CH_3)_2$ $(CH_2)_2$—, —CONH—$(CH_2)_3Si(CH_3)_2)_2O(Si(CH_3)_2O(Si(CH_3)_2O)_{10}Si(CH_3)_2(CH_2)_2$—, —CONH—$(CH_2)_3Si(CH_3)_2OSi(CH_3)_2O)_{20}Si(CH_3)_2$ $(CH_2)_2$—

—$C(O)O$—$(CH_2)_3$—,

—$C(O)O$—$(CH_2)_6$—,

—$CH_2$—O—$(CH_2)_3$—$Si(CH_3)_2$—$(CH_2)_2$—$Si(CH_3)_2$—$(CH_2)_2$—, —$CH_2$—O—$(CH_2)_3$—$Si(CH_3)_2$—$(CH_2)_2$—Si $(CH_3)_2$—$CH(CH_3)$—,

—$CH_2$—O—$(CH_2)_3$—$Si(CH_3)_2$—$(CH_2)_2$—$Si(CH_3)_2$— $(CH_2)_3$—,

—$CH_2$—O—$(CH_2)_3$—$Si(CH_3)_2$—$(CH_2)_2$—$Si(CH_3)_2$—CH $(CH_3)$—$CH_2$—,

—$OCH_2$—,

—$O(CH_2)_3$—,

—$OCFHCF_2$—,

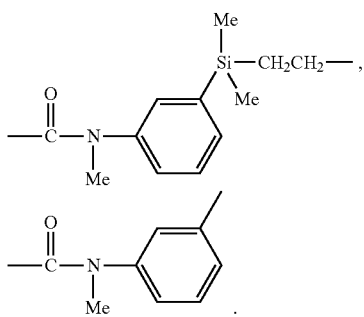

.

In the formula, $R^a$ is each independently at each occurrence —Z—$SiR^{71}_pR^{72}_qR^{73}_r$.

In the formula, Z is each independently at each occurrence an oxygen atom or a divalent organic group.

Z is preferably a divalent organic group, and does not include a group which forms a siloxane bond together with a Si atom (the Si atom binding to $R^a$) present in the end of the molecular backbone of the formula (C1) or the formula (C2).

Z is preferably a $C_{1-6}$ alkylene group, —$(CH_2)_g$—O—$(CH_2)_h$— (wherein g is an integer of 1-6, h is an integer of 1-6) or -phenylene-$(CH_2)_i$— (wherein i is an integer of 0-6), more preferably a $C_{1-3}$ alkylene group. These groups may be substituted with, for example, one or more substituents selected form a fluorine atom, a $C_{1-6}$ alkyl group, a $C_{2-6}$ alkenyl group, and a $C_{2-6}$ alkynyl group.

In the formula, $R^{71}$ is each independently at each occurrence $R^{a'}$. $R^{a'}$ is as defined for $R^a$.

In $R^a$, the number of Si atoms which are linearly connected via Z is up to five. That is, in $R^a$, when there is at least one $R^{71}$, there are two or more Si atoms which are linearly connected via Z in $R^a$. The number of such Si atoms which are linearly connected via Z is five at most. It is noted that "the number of such Si atoms which are linearly connected via Z in $R^a$ is equal to the repeating number of —Z—Si— which are linearly connected in $R^a$.

For example, one example in which Si atoms are connected via Z in $R^a$ is shown below.

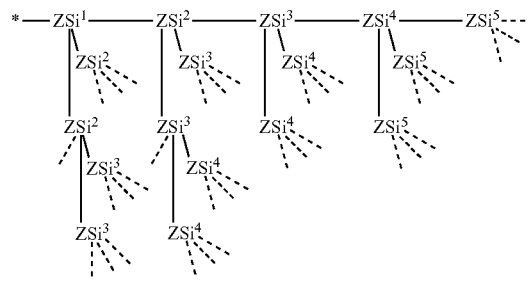

In the above formula, * represents a position binding to Si of the main backbone, and . . . represents that a predetermined group other than ZSi binds thereto, that is, when all three bonds of a Si atom are . . . , it means an end point of the repeat of ZSi. The number on the right shoulder of Si means the number of occurrences of Si which is linearly connected via the Z group from *. In other words, in the chain in which the repeat of ZSi is completed at $Si^2$, "the number of such Si atoms which are linearly connected via the Z group in $R^a$" is 2. Similarly, in the chain in which the repeat of ZSi is completed at $Si^3$, $Si^4$ and $Si^5$, respectively, "the number of such Si atoms which are linearly connected via the Z group in $R^a$" is 3, 4 and 5. It is noted that as seen from the above formula, there are some ZSi chains, but they need not have the same length and may be have arbitrary length.

In a preferred embodiment, as shown below, "the number of such Si atoms which are linearly connected via the Z group in $R^a$" is 1 (left formula) or 2 (right formula) in all chains.

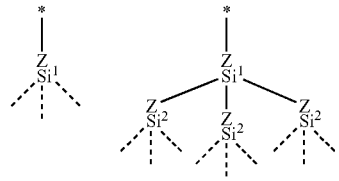

In one embodiment, the number of such Si atoms which are linearly connected via the Z group in $R^a$ is 1 or 2, preferably 1.

In the formula, $R^{72}$ is each independently at each occurrence a hydroxyl group or a hydrolyzable group.

The "hydrolyzable group" as used herein represents a group which is able to undergo a hydrolysis reaction. Examples of the hydrolyzable group include —OR, —OCOR, —O—N=$C(R)_2$, —$N(R)_2$, —NHR, halogen (wherein R is a substituted or non-substituted alkyl group having 1-4 carbon atoms), preferably —OR (an alkoxy group). Examples of R include a non-substituted alkyl group such as a methyl group, an ethyl group, a propyl group, an isopropyl group, a n-butyl group, an isobutyl group; a substituted alkyl group such as a chloromethyl group. Among them, an alkyl group, in particular a non-substituted alkyl group is preferable, a methyl group or an ethyl group is more preferable. The hydroxyl group may be, but is not particularly limited to, a group generated by hydrolysis of a hydrolyzable group.

Preferably, $R^{72}$ is —OR wherein R is a substituted or unsubstituted $C_{1-3}$ alkyl group, more preferably a methyl group.

In the formula, $R^{73}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, p is each independently at each occurrence an integer of 0-3; q is each independently at each occurrence an integer of 0-3; and r is each independently at each occurrence an integer of 0-3. The sum of p, q and r is 3.

In a preferable embodiment, in $R^{a'}$ at the end of $R^{a}$ ($R^{a}$ when $R^{a'}$ is absent), q is preferably 2 or more, for example, 2 or 3, more preferably 3.

In the formulae (C1) and (C2), at least one $R^{72}$ is present.

In the formula, $R^{b}$ is each independently at each occurrence a hydroxyl group or a hydrolyzable group.

$R^{b}$ is preferably a hydroxyl group, —OR, —OCOR, —O—N=C(R)$_2$, —N(R)$_2$, —NHR, halogen (wherein R is a substituted or unsubstituted alkyl group having 1-4 carbon atoms), more preferably —OR. R is an unsubstituted alkyl group such as a methyl group, an ethyl group, a propyl group, an isopropyl group, a n-butyl group, an isobutyl group; a substituted alkyl group such as a chloromethyl group.

Among them, an alkyl group, in particular unsubstituted alkyl group is preferable, and a methyl group or an ethyl group is more preferable. The hydroxyl group may be, but is not particularly limited to, a group generated by hydrolysis of a hydrolyzable group. More preferably, $R^{c}$ is —OR wherein R is a substituted or unsubstituted $C_{1-3}$ alkyl group, more preferably a methyl group.

In the formula, $R^{c}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, k is each independently at each occurrence an integer of 0-3; l is each independently at each occurrence an integer of 0-3; m is each independently at each occurrence an integer of 0-3. The sum of k, l and m is 3.

The compound of the formulae (C1) and (C2) can be prepared, for example, by introducing a hydroxyl group in the end of a perfluoropolyether derivative corresponding to the Rf-PFPE moiety as a raw material, followed by further introducing a group having an unsaturated group in the end thereof, and reacting the group having an unsaturated group with a silyl derivative having a halogen atom, further introducing a hydroxyl group in the end of the silyl group, and then reacting the group having an unsaturated group with a silyl derivative. For example, the compound can be prepared as described in WO 2014/069592.

Formulae (D1) and (D2):

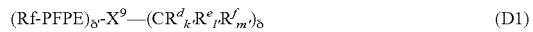  (D1)

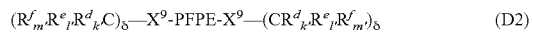  (D2)

In the formulae (D1) and (D2), Rf and PFPE are as defined for the formulae (A1) and (A2).

In the formula, $X^9$ is each independently a single bond or a 2-10 valent organic group. $X^9$ is recognized to be a linker which connects between a perfluoropolyether moiety (i.e., an Rf-PFPE moiety or -PFPE-moiety) providing mainly water-repellency, surface slip property and the like and a moiety (i.e., a group in parentheses with the subscript δ) providing an ability to bind to a base material in the compound of the formula (D1) and (D2). Therefore, $X^9$ may be any organic group as long as the compound of the formula (D1) and (D2) can stably exist.

In the formula, δ is an integer of 1-9, and δ' is an integer of 1-9. δ and δ' may be determined depending on the valence number of $X^9$, and in the formula (D1), the sum of δ and δ' is the valence number of $X^9$. For example, when $X^9$ is a 10 valent organic group, the sum of δ and δ' is 10, for example, δ is 9 and δ' is 1, δ is 5 and δ' is 5, or δ is 1 and δ' is 9. When $X^9$ is a divalent organic group, δ and δ' are 1. In the formula (D1), δ is a value obtained by subtracting 1 from the valence number of $X^9$.

$X^9$ is preferably a 2-7 valent, more preferably a 2-4 valent, further preferably a divalent organic group.

In one embodiment, $X^9$ is a 2-4 valent organic group, γ is 1-3, and γ' is 1.

In another embodiment, $X^9$ is a divalent organic group, γ is 1, and γ' is 1. In this case, the formulae (D1) and (D2) are represented by the following formulae (D1') and (D2').

  (D1')

  (D2')

Examples of $X^9$ include, but are not particularly limited to, for example, the same groups as those described for $X^1$.

Among them, a preferable specific embodiment of $X^9$ includes:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(O)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$Si(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—, —CONH—(CH$_2$)$_3$—,
—CON(CH$_3$)—(CH$_2$)$_3$—,
—CON(Ph)-(CH$_2$)$_3$— (wherein Ph is phenyl),
—CONH—(CH$_2$)$_6$—,
—CON(CH$_3$)—(CH$_2$)$_6$—,
—CON(Ph)-(CH$_2$)$_6$— (wherein Ph is phenyl),
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
(CH$_2$)$_2$S(CH$_2$)$_3$—,
—CONH—(CH$_2$)$_3$Si(CH$_3$)$_2$OSi(C$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

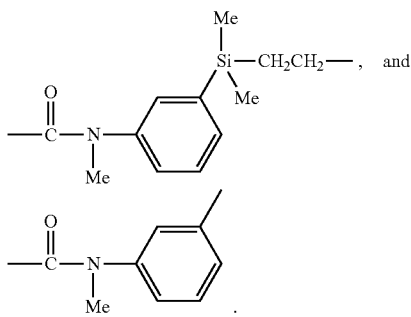

In the formula, R$^d$ is each independently at each occurrence —Z'—CR$^{81}_p$R$^{82}_q$R$^{83}_{r''}$.

In the formula, Z' is each independently at each occurrence, an oxygen atom or a divalent organic group.

Z' is preferably a C$_{1-6}$ alkylene group, —(CH$_2$)$_g$—O—(CH$_2$)$_h$— (wherein g is an integer of 0-6, for example, an integer of 1-6, h is an integer of 0-6, for example, an integer of 1-6) or -phenylene-(CH$_2$)$_i$— (wherein i is an integer of 0-6), more preferably a C$_{1-3}$ alkylene group.

These groups may be substituted with, for example, one or more substituents selected form a fluorine atom, a C$_{1-6}$ alkyl group, a C$_{2-6}$ alkenyl group, and a C$_{2-6}$ alkynyl group.

In the formula, R$^{81}$ is each independently at each occurrence R$^{d'}$. R$^{d'}$ is as defined for R$^d$.

In R$^d$, the number of C atoms which are linearly connected via Z' is up to five. That is, in R$^d$, when there is at least one R$^{81}$, there are two or more C atoms which are linearly connected via Z' in R$^d$. The number of such C atoms which are linearly connected via Z' is five at most. It is noted that "the number of such C atoms which are linearly connected via Z' in R$^d$ is equal to the repeating number of —Z'—C— which are linearly connected in R$^d$.

In a preferred embodiment, as shown below, "the number of such C atoms which are linearly connected via the Z' group in R$^d$ is 1 (left formula) or 2 (right formula) in all chains.

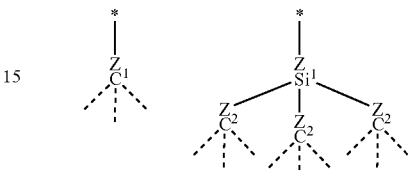

In one embodiment, the number of such C atoms which are linearly connected via the Z' group in R$^d$ is 1 or 2, preferably 1.

In the formula, R$^{82}$ is —Y—SiR$^{85}_j$R$^{86}_{3-j}$.

Y is each independently at each occurrence a divalent organic group.

In a preferable embodiment, Y is a C$_{1-6}$ alkylene group, —(CH$_2$)$_{g'}$—O—(CH$_2$)$_{h'}$— (wherein g' is an integer of 0-6, for example, an integer of 1-6, and h' is an integer of 0-6, for example, an integer of 1-6), or -phenylene-(CH$_2$)$_{i'}$— (wherein i' is an integer of 0-6). These groups may be substituted with, for example, one or more substituents selected form a fluorine atom, a C$_{1-6}$ alkyl group, a C$_{2-6}$ alkenyl group, and a C$_{2-6}$ alkynyl group.

In one embodiment, Y may be a C$_{1-6}$ alkylene group or -phenylene-(CH$_2$)$_{i'}$—. When Y is the above group, a light resistance, in particular an ultraviolet resistance, may be increased.

R$^{85}$ is each independently at each occurrence a hydroxyl group or a hydrolyzable group.

Examples of the "hydrolyzable group" include the same group as those described for the formulae (C1) and (C2).

Preferably, R$^{85}$ is —OR wherein R is a substituted or unsubstituted C$_{1-3}$ alkyl group, more preferably an ethyl group or a methyl group, in particular a methyl group.

In the formula, R$^{86}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

j is an integer of 1-3, preferably 2 or 3, more preferably 3, independently per unit —Y—SiR$^{85}_j$R$^{86}_{3-j}$.

In the formula, R$^{83}$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, p' is each independently at each occurrence an integer of 0-3; q' is each independently at each occurrence an integer of 0-3; r' is each independently at each occurrence an integer of 0-3. The sum of p', q' and r' is 3.

In a preferable embodiment, in R$^{d'}$ (when R$^d$, is absent, R$^d$) at the terminal of R$^d$, q' is preferably 2 or more, for example 2 or 3, more preferably 3.

In the formula, R$^e$ is each independently at each occurrence —Y—SiR$^{85}_j$R$^{86}_{3-j}$. Y, R$^{85}$, R$^{86}$ and j are as defined for R$^{82}$.

In the formula, $R^f$ is each independently at each occurrence a hydrogen atom or a lower alkyl group. The lower alkyl group is preferably an alkyl group having 1-20 carbon atoms, more preferably an alkyl group having 1-6 carbon atoms, further preferably a methyl group.

In the formula, k' is each independently at each occurrence an integer of 0-3; l' is each independently at each occurrence an integer of 0-3; and m' is each independently at each occurrence an integer of 0-3. The sum of k', l' and m' is 3.

In one embodiment, at least one k' is 2 or 3, preferably 3.
In one embodiment, k' is 2 or 3, preferably 3.
In one embodiment, l' is 2 or 3, preferably 3.

In the formula (D1) and (D1), at least one q is 2 or 3, or at least one l is 2 or 3. That is, there are at least two $—Y—SiR^{85}_jR^{86}_{3-j}$ groups in the formula.

The perfluoro(poly)ether group containing silane compound of the formula (D1) or the formula (D1) can be prepared by a combination of known methods. For example, a compound of the formula (D1') wherein X is a divalent group can be prepared below, although the present invention is not limited thereto.

A group containing a double bond (preferably allyl), and a halogen (preferably bromo) are introduced into polyol of $HO—X—C(YOH)_3$ (wherein X and Y are each independently a divalent organic group) to obtain a halide having a double bond of $Hal-X—C(Y—O—R—CH=CH_2)_3$ (wherein Hal is halogen, for example Br, and R is a divalent organic group, for example an alkylene group). Then, halogen at the terminal is reacted with a perfluoropolyether group containing alcohol of $R^{PFPE}—OH$ (wherein $R^{PFPE}$ is a perfluoropolyether group containing group.) to obtain $R^{PFPE}—O—X—C(Y—O—R—CH=CH_2)_3$. Then, $—CH=CH_2$ at the terminal is reacted with $HSiCl_3$ and an alcohol or $HSiR^{85}_3$ to obtain $R^{PFPE}—O—X—C(Y—O—R—CH_2—CH_2—SiR^{85}_3)_3$.

The number average molecular weight of the perfluoropolyether group containing silane compound contained in the surface-treating agent used in the present invention is preferably 5,000 or more, more preferably 6,000 or more, preferably 100,000 or less, more preferably 30,000 or less, further preferably 10,000 or less.

The number average molecular weight of the perfluoropolyether portion (Rf-PFPE portion or -PFPE-portion) of the perfluoropolyether group containing silane compound contained in the surface-treating agent used in the present invention may be, not particularly limited to, preferably 4,000-30,000, more preferably 5,000-10,000.

The surface treating agent used in the present invention may be diluted with a solvent. Examples of the solvent include, but are not particularly limited to, for example, a solvent selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (ZEORORA H (trade name), etc.), $C_4F_9OCH_3$, $C_4F_9OC_2H_5$, $CF_3CH_2OCF_2CHF_2$, $C_6F_{13}CH=CH_2$, xylene hexafluoride, perfluorobenzene, methyl pentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O)_m(CF_2O)_nCF_2CF_3$ [wherein m and n are each independently an integer of 0 or more and 1000 or less, the occurrence order of the respective repeating units in parentheses with the subscript m or n is not limited in the formula, with the proviso that the sum of m and n is 1 or more.], 1,1-dichloro-2,3,3,3-tetrafluoro-1-propene, 1,2-dichloro-1,3,3,3-tetrafluoro-1-propene, 1,2-dichloro-3,3,3-trichloro-1-propene, 1,1-dichloro-3,3,3-trichloro-1-propene, 1,1,2-trichloro-3,3,3-trichloro-1-propene, 1,1,1,4,4,4-hexafluoro-2-butene. These solvents may be used alone or as a mixture of 2 or more compound.

The surface treating agent used in the present invention may comprise other components in addition to the perfluoropolyether group containing silane compound. Examples of the other components include, but are not particularly limited to, for example, a (non-reactive) fluoropolyether compound which may be also understood as a fluorine-containing oil, preferably a perfluoropolyether compound (hereinafter, referred to as "the fluorine-containing oil"), a (non-reactive) silicone compound which may be also understood as a silicone oil (hereinafter referred to as "a silicone oil"), a catalyst, and the like.

Examples of the above-mentioned fluorine-containing oil include, but are not particularly limited to, for example, a compound of the following general formula (3) (a perfluoropolyether compound).

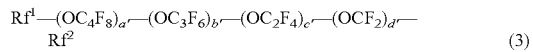
$$Rf^1—(OC_4F_8)_{a'}—(OC_3F_6)_{b'}—(OC_2F_4)_{c'}—(OCF_2)_{d'}—Rf^2 \quad (3)$$

In the formula, $Rf^1$ is a $C_{1-16}$ alkyl group which may be substituted by one or more fluorine atoms (preferably, a $C_{1-16}$ perfluoroalkyl group), $Rf^2$ is a $C_{1-16}$ alkyl group which may be substituted by one or more fluorine atoms (preferably, a $C_{1-16}$ perfluoroalkyl group), a fluorine atom or a hydrogen atom, and more preferably, $Rf^1$ and $Rf^2$ is each independently a $C_{1-3}$ perfluoroalkyl group.

Subscripts a', b', c' and d' are the repeating number of each of four repeating units of perfluoropolyether which constitute a main backbone of the polymer, and are each independently an integer of 0 or more and 300 or less, and the sum of a', b', c' and d' is at least 1, preferably 1-300, more preferably 20-300. The occurrence order of the respective repeating units in parentheses with the subscript a', b', c' or d' is not limited in the formulae. Among these repeating units, the $—(OC_4F_8)—$ group may be any of $—(OCF_2CF_2CF_2CF_2)—$, $—(OCF(CF_3)CF_2CF_2)—$, $—(OCF_2CF(CF_3)CF_2)—$, $—(OCF_2CF_2CF(CF_3))—$, $—(OC(CF_3)_2CF_2)—$, $—(OCF_2C(CF_3)_2)—$, $—(OCF(CF_3)CF(CF_3))—$, $—(OCF(C_2F_5)CF_2)—$ and $—(OCF_2CF(C_2F_5))—$, preferably $—(OCF_2CF_2CF_2CF_2)$. The $—(OC_3F_6)—$ group may be any of $—(OCF_2CF_2CF_2)—$, $—(OCF(CF_3)CF_2)—$ and $—(OCF_2CF(CF_3))—$, preferably $—(OCF_2CF_2CF_2)—$. The $—(OC_2F_4)—$ group may be any of $—(OCF_2CF_2)—$ and $—(OCF(CF_3))—$, preferably $—(OCF_2CF_2)—$.

Examples of the perfluoropolyether compound of the above general formula (3) include a compound of any of the following general formulae (3a) and (3b) (may be one compound or a mixture of two or more compounds).

$$Rf^1—(OCF_2CF_2CF_2)_{b''}—Rf^2 \quad (3a)$$

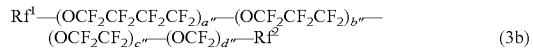
$$Rf^1—(OCF_2CF_2CF_2CF_2)_{a''}—(OCF_2CF_2CF_2)_{b''}—(OCF_2CF_2)_{c''}—(OCF_2)_{d''}—Rf^2 \quad (3b)$$

In these formulae:

$Rf^1$ and $Rf^2$ are as defined above; in the formula (3a), b" is an integer of 1 or more and 100 or less; and in the formula (3b), a" and b" are each independently an integer of 0 or more and 30 or less, for example 1 or more and 30 or less, and c" and d" are each independently an integer of 1 or more and 300 or less. The occurrence order of the respective repeating units in parentheses with the subscript a", b", c" or d" is not limited in the formulae.

The above-mentioned fluorine-containing oil may have an average molecular weight of 1,000-30,000. By having such average molecular weight, high surface slip property can be obtained.

The fluorine-containing oil may be contained in the surface-treating agent used in the present invention, for example, at 0-500 parts by mass, preferably 0-400 parts by mass, more preferably 5-300 parts by mass with respect to 100 parts by mass of the perfluoropolyether group containing silane compound (as the total mass when two or more compounds are used; hereinafter the same shall apply).

The compound of the general formula (3a) and the compound of the general formula (3b) may be used alone or in combination. The compound of the general formula (3b) is preferable than the compound of the general formula (3a) since the compound of the general formula (3b) provides higher surface slip property than the compound of the general formula (3a). When they are used in combination, the ratio by mass of the compound of the general formula (3a) to the compound of the general formula (3b) is preferably 1:1 to 1:30, more preferably 1:1 to 1:10. By applying such ratio by mass, a perfluoropolyether group-containing silane-based coating which provides a good balance of surface slip property and friction durability can be obtained.

In one embodiment, the fluorine-containing oil comprises one or more compounds of the general formula (3b) In such embodiment, the mass ratio of the perfluoropolyether group containing silane compound to the compound of the formula (3b) in the surface-treating agent is preferably 10:1 to 1:10, more preferably 4:1 to 1:4.

In one embodiment, an average molecular weight of the compound of the formula (3a) is preferably 2,000-8,000.

In one embodiment, an average molecular weight of the compound of the formula (3b) is preferably 8,000-30,000.

In another embodiment, an average molecular weight of the compound of the formula (3b) is preferably 3,000-8,000.

In a preferable embodiment, when a surface-treating layer is formed by using vacuum deposition, an average molecular weight of the fluorine-containing oil may be higher than an average molecular weight of the perfluoropolyether group containing silane compound. By selecting such average molecular weights, more excellent surface slip property and friction durability can be obtained.

From the other point of view, the fluorine-containing oil may be a compound of the general formula $Rf^3$—F wherein $Rf^3$ is a $C_{5-16}$ perfluoroalkyl group. In addition, the fluorine-containing oil may be a chlorotrifluoroethylene oligomer. The compound of $Rf^3$—F or the chlorotrifluoroethylene oligomer is preferable because the compounds have high affinity for the fluorine-containing compound having a carbon-carbon unsaturated bond at the molecular terminal wherein a terminal is a $C_{1-16}$ perfluoroalkyl group.

The fluorine-containing oil contributes to increasing of surface slip property of the surface-treating layer.

Examples of the above-mentioned silicone oil include, for example, a liner or cyclic silicone oil having 2,000 or less siloxane bonds. The liner silicone oil may be so-called a straight silicone oil and a modified silicon oil. Examples of the straight silicone oil include dimethylsilicone oil, methylphenylsilicone oil, and methylhydrogensilicone oil. Examples of the modified silicone oil include that which is obtained by modifying a straight silicone oil with alkyl, aralkyl, polyether, higher fatty acid ester, fluoroalkyl, amino, epoxy, carboxyl, alcohol, or the like. Examples of the cyclic silicone oil include, for example, cyclic dimethylsiloxane oil.

The silicone oil may be contained in the surface-treating agent used in the present invention, for example, at 0-300 parts by mass, preferably 0-200 parts by mass with respect to 100 parts by mass of the perfluoropolyether group containing silane compound (as the total mass when two or more compounds are used; hereinafter the same shall apply).

The silicone oil contributes to increasing of surface slip property of the surface-treating layer.

Examples of the above-mentioned catalyst include an acid (for example, acetic acid, trifluoroacetic acid, etc.), a base (for example, ammonia, triethylamine, diethylamine, etc.), a transition metal (for example, Ti, Ni, Sn, etc.), and the like.

The catalyst facilitates hydrolysis and dehydration-condensation of the perfluoropolyether group containing silane compound to facilitate a formation of the surface-treating layer.

Examples of the method of forming the surface treating layer include, for example, a method in which a film of the surface treating agent comprising a fluorine-containing silane compound is formed on the surface of the intermediate layer and the film is post-treated, as necessary, and thereby the surface-treating layer is formed.

The formation of the film of the surface-treating agent can be performed by applying the above surface-treating agent on the surface of the intermediate layer such that the surface-treating agent coats the surface. The method of coating is not specifically limited. For example, a wet coating method or a dry coating method can be used.

Examples of the wet coating method include dip coating, spin coating, flow coating, spray coating, roll coating, gravure coating, and a similar method.

Examples of the dry coating method include the PVD, the CVD and similar methods. The PVD is a method in which atoms of a solid material is vaporized by heating the solid material in a vacuum (vacuum deposition), or irradiating high-speed electrons or ions to give the physical energy the atoms on the surface of the solid, and the vaporized material is re-bonded on the intermediate layer to form a thin film. Examples of the PVD include, but are not particularly limited to, deposition (usually, vacuum deposition), sputtering, and the like. The specific examples of the deposition method (usually, vacuum deposition) include resistance heating, electron beam, high-frequency heating using microwave, etc., ion beam, and a similar method. The specific examples of the CVD include plasma-CVD, optical CVD, thermal CVD and a similar method. Among them, the PVD is preferable, in particular deposition, for example the resistance heating deposition or the electron beam deposition is preferable, and the electron beam deposition is more preferable By using the PVD, the surface treating layer having higher friction durability can be obtained.

Additionally, coating can be performed by an atmospheric pressure plasma method.

When the wet coating method is used, the surface-treating agent used in the present invention is diluted with a solvent, and then it is applied to the surface of the intermediate layer. In view of stability of the surface-treating agent used in the present invention and volatile property of the solvent, the following solvents are preferably used: a $C_{5-12}$ aliphatic perfluorohydrocarbon (for example, perfluorohexane, perfluoromethylcyclohexane and perfluoro-1,3-dimethylcyclohexane); an aromatic polyfluorohydrocarbon (for example, bis(trifluoromethyl)benzene); an aliphatic polyfluorohydrocarbon (for example, $C_6F_{13}CH_2CH_3$ (for example, ASAHIKLIN (registered trademark) AC-6000 manufactured by Asahi Glass Co., Ltd.), 1,1,2,2,3,3,4-heptafluorocyclopentane (for example, ZEORORA (registered trademark) H manufactured by Nippon Zeon Co., Ltd.); hydrofluorocarbon (HFC) (for example, 1,1,1,3,3-pentafluorobutane (HFC-365mfc)); hydrochlorofluorocarbon (for example, HCFC-225 (ASAHIKLIN (registered trademark) AK225)); a hydrofluoroether (HFE) (for example, an alkyl perfluoroalkyl ether such as perfluoropropyl methyl ether ($C_3F_7OCH_3$) (for example, Novec (trademark) 7000 manufactured by Sumitomo 3M Ltd.), perfluorobutyl methyl ether ($C_4F_9OCH_3$) (for example, Novec (trademark) 7100 manufactured by Sumitomo 3M Ltd.), perfluorobutyl ethyl ether ($C_4F_9OC_2H_5$) (for example, Novec (trademark) 7200 manufactured by Sumitomo 3M Ltd.), and perfluorohexyl methyl ether ($C_2F_5CF(OCH_3)C_3F_7$) (for example, Novec (trademark) 7300 manufactured by Sumitomo 3M Ltd.) (the perfluoroalkyl group and the alkyl group may be liner or branched)), or $CF_3CH_2OCF_2CHF_2$ (for example, ASAHIKLIN (registered trademark) AE-3000 manufactured by Asahi Glass Co., Ltd.), 1,2-dichloro-1,3,3,3-tetrafluoro-1-propene (for example, VERTREL (registered trademark) Sion manufactured by Du Pont-Mitsui Fluorochemicals Co., Ltd.) and the like. These solvents may be used alone or as a mixture of 2 or more compound. Among them, the hydrofluoroether is preferable, perfluorobutyl methyl ether ($C_4F_9OCH_3$) and/or perfluorobutyl ethyl ether ($C_4F_9OC_2H_5$) are particularly preferable. Furthermore, the solvent can be mixed with another solvent, for example, to adjust solubility of the perfluoro(poly)ether group containing silane compound.

When the dry coating method is used, the surface-treating agent used in the present invention may be directly subjected to the dry coating method, or may be diluted with a solvent, and then subjected to the dry coating method.

The formation of the film is preferably performed so that the surface-treating agent used in the present invention is present together with a catalyst for hydrolysis and dehydration-condensation in the coating. Simply, when the wet coating method is used, after the surface-treating agent used in of the present invention is diluted with a solvent, and just prior to applying it to the surface of the intermediate layer, the catalyst may be added to the diluted solution of the surface-treating agent of the present invention. When the dry coating method is used, the surface-treating agent of the present invention to which a catalyst has been added is used itself in deposition (usually, vacuum deposition), or pellets may be used in the deposition (usually, the vacuum deposition), wherein the pellets is obtained by impregnating a porous metal such as iron or copper with the surface-treating agent of the present invention to which the catalyst has been added.

As the catalyst, any suitable acid or base can be used. As the acid catalyst, for example, acetic acid, formic acid, trifluoroacetic acid, or the like can be used. As the base catalyst, for example, ammonia, an organic amine, or the like can be used.

Next, the film is post-treated as necessary. This post-treatment is, but not limited to, a treatment in which water supplying and dry heating are sequentially performed, in more particular, may be performed as follows.

After the film of the surface-treating agent is formed on the surface of the intermediate layer as mentioned above, water is supplied to this film (hereinafter, referred to as precursor coating). The method of supplying water may be, for example, a method using dew condensation due to the temperature difference between the precursor coating (and the base material having the intermediate layer) and ambient atmosphere or spraying of water vapor (steam), but not specifically limited thereto.

It is considered that, when water is supplied to the precursor coating, water acts on a hydrolyzable group bonding to Si present in the perfluoropolyether group containing silane compound in the surface-treating agent, thereby enabling rapid hydrolysis of the compound.

The supplying of water may be performed under an atmosphere, for example, at a temperature of 0-250° C., preferably 60° C. or more, more preferably 100° C. or more and preferably 180° C. or less, more preferably 150° C. By supplying water at such temperature range, hydrolysis can proceed. The pressure at this time is not specifically limited but simply may be ambient pressure.

Then, the precursor coating is heated on the surface of the intermediate layer under a dry atmosphere over 60° C. The method of dry heating may be to place the precursor coating together with the intermediate layer and the base material in an atmosphere at a temperature over 60° C., preferably over 100° C., and for example, of 250° C. or less, preferably of 180° C. or less, and at unsaturated water vapor pressure, but not specifically limited thereto. The pressure at this time is not specifically limited but simply may be ambient pressure.

Under such atmosphere, between the PFPE containing silane compound of the present inventions, the groups bonding to Si after hydrolysis are rapidly dehydration-condensed with each other. Furthermore, between the compound and the intermediate layer, the group bonding to Si in the compound after hydrolysis and a reactive group present on the surface of the intermediate layer are rapidly reacted, and when the reactive group present on the surface of the intermediate layer is a hydroxyl group, dehydration-condensation is caused. As the result, the bond between the perfluoro(poly)ether group containing silane compound and the intermediate layer is formed.

The above supplying of water and dry heating may be sequentially performed by using a superheated water vapor.

The superheated water vapor is a gas which is obtained by heating a saturated water vapor to a temperature over the boiling point, wherein the gas, under an ambient pressure, has become to have a unsaturated water vapor pressure by heating to a temperature over 100° C., generally of 500° C. or less, for example, of 300° C. or less, and over the boiling point. In the present invention, in view of suppressing decomposition of the perfluoropolyether group containing silane compound, the superheated water vapor of preferably 250° C. or less, preferably 180° C. or less is used in the supplying of water and dry heating. When the base material on which the precursor coating is formed is exposed to a superheated water vapor, firstly, due to the temperature difference between the superheated water vapor and the precursor coating of a relatively low temperature, dew condensation is generated on the surface of the precursor coating, thereby supplying water to the precursor coating. Presently, as the temperature difference between the superheated water vapor and the precursor coating decreases, water on the surface of the precursor coating is evaporated under the dry atmosphere of the superheated water vapor, and an amount of water on the surface of the precursor coating gradually decreases. During the amount of water on the surface of the precursor coating is decreasing, that is, during the precursor coating is under the dry atmosphere, the precursor coating on the surface of the base material contacts with the superheated water vapor, as a result, the precursor coating is heated to the temperature of the superheated water vapor (temperature over 100° C. under ambient pressure). Therefore, by using a superheated water vapor, supplying of water and dry heating are enabled to be sequentially carried out simply by exposing the base material on which the precursor coating is formed to a superheated water vapor.

As mentioned above, the post-treatment can be performed. It is noted that though the post-treatment may be performed in order to further increase friction durability, it is not essential in the producing of the article of the present invention. For example, after applying the surface-treating agent to the surface of the intermediate layer, it may be enough to only stand the intermediate layer.

As described above, the surface-treating layer derived from the film of the surface-treating agent of the present invention is formed on the surface of the intermediate layer to produce the article of the present invention. The surface-treating layer thus formed has high friction durability. Furthermore, this surface-treating layer may have water-repellency, oil-repellency, antifouling property (for example, preventing from adhering a fouling such as fingerprints), waterproof property (preventing the ingress of water into an electrical member, and the like), surface slip property (or lubricity, for example, wiping property of a fouling such as fingerprints and excellent tactile feeling in a finger) depending on a composition of the surface-treating agent used, in addition to high friction durability, thus may be suitably used as a functional thin film.

As mentioned above, the surface treating layer having high friction durability can be formed by forming the intermediate layer on the base material of zirconium oxide.

Therefore, the present invention provides a process for forming a surface treating layer from a surface treating agent comprising a fluorine-containing silane compound on a base material of zirconium oxide, comprising:

forming an intermediate layer from one or more metal oxides on the base material of zirconium oxide, and then forming the surface treating layer from a surface treating agent comprising a fluorine-containing silane compound on the intermediate layer.

In a preferably embodiment, the formation of the intermediate layer is performed by forming an aluminum oxide layer on the base material of zirconium oxide, and then forming a silicon oxide layer on the aluminum oxide layer.

The present invention provides also process for producing an article comprising a base material of zirconium oxide, an intermediate layer located on the base material, and a surface treating layer formed from a surface treating agent comprising a fluorine-containing silane compound located on the intermediate layer, comprising:

forming an intermediate layer from one or more metal oxides on the base material of zirconium oxide, and then, forming the surface treating layer from a surface treating agent comprising a fluorine-containing silane compound on the intermediate layer.

In a preferably embodiment, the formation of the intermediate layer is performed by forming an aluminum oxide layer on the base material of zirconium oxide, and then forming a silicon oxide layer on the aluminum oxide layer.

EXAMPLES

Hereinbefore, the article of the present invention is described in detail through Examples. However, the present invention is not limited to Examples.

Preparative Example

The fluorine-containing compound of the following formula (average composition) was dissolved in hydrofluoroether (Novec HFE7200 manufactured by Sumitomo 3M Ltd.)) such that the concentration was 20 wt % to prepare surface-treating agent.

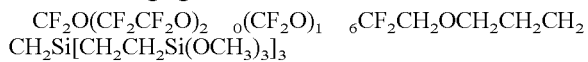

It is noted that in an average composition, although 0.17 repeating units of $(CF_2CF_2CF_2CF_2O)$ and 0.18 repeating unit of $(CF_2CF_2CF_2O)$ were contained, these repeating units were omitted since these amount were slight.

Examples 1-11

The metal oxide shown in the following table was deposited on a base material of zirconium oxide (7 cm×5 cm) at the prescribed thickness by Electron Beam Deposition to form an intermediate layer. Next, the surface treating agent prepared above was deposited on the intermediate layer at the prescribed amount to form a layer of the surface treating agent. Then, the base material on which the surface treating agent was formed was stood at 20° C. under an ambient of humidity of 65% for 24 hours. Thereby, the layer of the surface treating agent was cured and the surface-treating layer was obtained.

Comparative Example 1

The surface-treating layer was formed similarly to the above example except that the surface treating agent was directly deposited without the formation of the intermediate layer on the base material of zirconium oxide.

Evaluation

Evaluation of Friction Durability

A static water contact angle of the surface-treating layers of Examples 1-11 and Comparative Example 1 was measured. The static water contact angle was measured for 1 μL of water by using a contact angle measuring instrument (manufactured by KYOWA INTERFACE SCIENCE Co., Ltd.).

Firstly, as an initial evaluation, the static water contact angle of the surface-treating layer of which the surface had not still contacted with anything after formation thereof was measured (the number of rubbing is zero).

Then, as an evaluation of the friction durability, a steel wool friction durability evaluation was performed. Specifically, the base material on which the surface-treating layer was formed was horizontally arranged, and then, a steel wool (grade No. 0000, dimensions: 10 mm×10 mm) was contacted with the exposed surface of the surface-treating layer and a load of 1000 gf was applied thereon. Then, the steel wool was shuttled while applying the load (distance: 120 mm (reciprocation), rate: 60 rpm). The evaluation was stopped when the measured value of the contact angle became to be less than 100 degree. The number of reciprocation is shown in the following table at the time of becoming the contact angle less than 100 degree.

Appearance Evaluation

The surface of the base material was evaluated after the deposition. The evaluation criteria are as follows:

○: It looks smooth, and the surface reflection was not observed.

Δ: Some surface reflection was observed.

x: It looks unsmooth, and the surface reflection was observed.

TABLE 1

| | Intermediate layer | | | | | |
|---|---|---|---|---|---|---|
| | Metal oxide (Left side is base material side) | Thickness of layer (nm) | Surface treating agent (mg) | Thickness of layer (nm) | Evaluation | |
| | | | | | Durability (times) | Appearance |
| Example 1 | SiO$_2$ | 13 | 60 | 15 | 2000 | ○ |
| Example 2 | SiO$_2$ | 30 | 120 | 30 | 2000 | ○ |
| Example 3 | Al$_2$O$_3$ | 40 | 120 | 30 | 2000 | ○ |
| Example 4 | Al$_2$O$_3$/SiO$_2$ | 10/13 | 60 | 15 | 2000 | ○ |
| Example 5 | Al$_2$O$_3$/SiO$_2$ | 40/13 | 60 | 15 | 2000 | ○ |
| Example 6 | Al$_2$O$_3$/SiO$_2$ | 13/13 | 120 | 30 | 5000 | ○ |
| Example 7 | Al$_2$O$_3$/SiO$_2$ | 15/15 | 120 | 30 | 7000 | ○ |
| Example 8 | Al$_2$O$_3$/SiO$_2$ | 20/20 | 120 | 30 | 7000 | ○ |
| Example 9 | Al$_2$O$_3$/SiO$_2$/ Al$_2$O$_3$/SiO$_2$ | 20/20/20/ 20 | 120 | 30 | 2000 | ○ |
| Example 10 | ZrO$_2$/Al$_2$O$_3$/ SiO$_2$ | 10/10/13 | 60 | 15 | 2000 | ○ |
| Example 11 | ZrO$_2$/Al$_2$O$_3$/ SiO$_2$ | 40/10/13 | 120 | 30 | 3000 | Δ |
| Comparative Example 1 | — | — | 60 | 15 | 1000 | × |

As seen from the above results, it was confirmed that the friction durability was improved by forming the intermediate layer of the metal oxide on the base material of zirconium oxide.

INDUSTRIAL APPLICABILITY

The present invention is suitably applied for forming the surface treating layer having high friction durability on the base material of zirconium oxide.

The present invention includes following embodiments:

Embodiment 1. An article comprising
a base material of zirconium oxide,
an intermediate layer located on the base material, and
a surface treating layer formed from a surface treating agent comprising a fluorine-containing silane compound located on the intermediate layer,
wherein the intermediate layer comprises one or more metal oxides.

Embodiment 2. The article according to Embodiment 1 wherein the intermediate layer comprises silicon oxide or aluminum oxide.

Embodiment 3. The article according to Embodiment 1 or 2 wherein the intermediate layer comprises silicon oxide.

Embodiment 4. The article according to any one of Embodiments 1-3 wherein the intermediate layer comprises silicon oxide and aluminum oxide.

Embodiment 5. The article according to any one of Embodiments 2-4 wherein the intermediate layer further comprises zirconium oxide.

Embodiment 6. The article according to any one of Embodiments 1-5 wherein the intermediate layer is composed of a plurality of metal oxide layers.

Embodiment 7. The article according to any one of Embodiments 1-6 wherein
the intermediate layer is composed of a plurality of metal oxide layers,
the metal oxide layer contacting to the base material is an aluminum oxide layer, and
the metal oxide layer contacting to the surface treating layer is a silicon oxide layer.

Embodiment 8. The article according to any one of Embodiments 1-7 wherein the fluorine-containing silane compound is one or more compounds of the general formula (A1), (A2), (B1), (B2), (C1), (C2), (D1) or (D2):

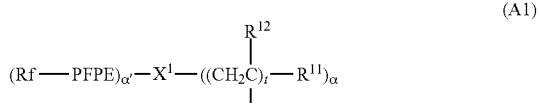

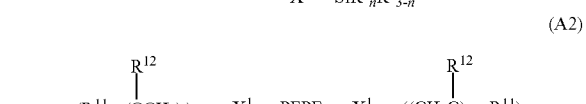

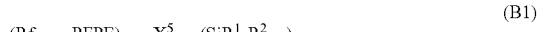

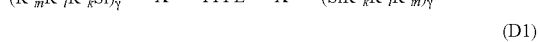

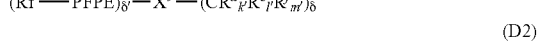

wherein:
PFPE is each independently at each occurrence a group of the formula:

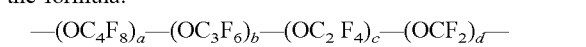

wherein a, b, c and d are each independently an integer of 0-200, the sum of a, b, c and d is at least one, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is, independently per a unit ($-SiR^1R^2_{3-n}$), an integer of 0-3;

there is at least one $R^2$ in the formulae (A1), (A2), (B1) and (B2);

$X^1$ is each independently a single bond or a 2-10 valent organic group;

$X^2$ is each independently at each occurrence a single bond or a divalent organic group;

t is each independently at each occurrence an integer of 1-10;

α is each independently an integer of 1-9;

α' is each independently an integer of 1-9;

$X^5$ is each independently a single bond or a 2-10 valent organic group;

β is each independently an integer of 1-9;

β' is an integer of 1-9;

$X^7$ is each independently a single bond or a 2-10 valent organic group;

γ is each independently an integer of 1-9;

γ' is an integer of 1-9;

$R^a$ is each independently at each occurrence $-Z-SiR^{7\ 1}_{\ p}R^{7\ 2}_{\ q}R^{7\ 3}_{\ r}$;

Z is each independently at each occurrence an oxygen atom or a divalent organic group;

$R^{7\ 1}$ is each independently at each occurrence $R^{a'}$;

$R^{a'}$ has the same definition as that of $R^a$;

in $R^a$, the number of Si atoms which are straightly linked via the Z group is up to five;

$R^{7\ 2}$ is each independently at each occurrence a hydroxyl group or a hydrolyzable group;

$R^{7\ 3}$ is each independently at each occurrence a hydrogen atom or a lower alkyl group;

p is each independently at each occurrence an integer of 0-3;

q is each independently at each occurrence an integer of 0-3;

r is each independently at each occurrence an integer of 0-3;

in each $-Z-SiR^{7\ 1}_{\ p}R^{7\ 2}_{\ q}R^{7\ 3}_{\ r}$, the sum of p, q and r is 3, and there is at least one $R^{7\ 2}$ in the formula (C1) and (C2);

$R^b$ is each independently at each occurrence a hydroxyl group or a hydrolyzable group;

$R^c$ is each independently at each occurrence a hydrogen atom or a lower alkyl group;

k is each independently at each occurrence an integer of 1-3;

l is each independently at each occurrence an integer of 0-2;

m is each independently at each occurrence an integer of 0-2;

the sum of k, l and m is 3 in each unit in parentheses with the subscript y;

$X^9$ is each independently a single bond or a 2-10 valent organic group;

δ is each independently an integer of 1-9;

δ' is an integer of 1-9;

$R^d$ is each independently at each occurrence $-Z'-CR^{8\ 1}_{\ p}R^{8\ 2}_{\ q}R^{8\ 3}_{\ r}$;

Z' is each independently at each occurrence an oxygen atom or a divalent organic group;

$R^{81}$ is each independently at each occurrence $R^{d'}$;

$R^{d'}$ has the same definition as that of $R^d$;

in $R^d$, the number of C atoms which are straightly linked via the Z' group is up to five;

$R^{82}$ is each independently at each occurrence $-Y-SiR^{85}_{\ j}R^{86}_{\ 3-j}$;

Y is each independently at each occurrence a divalent organic group;

$R^{85}$ is each independently at each occurrence a hydroxyl group or a hydrolyzable group;

$R^{86}$ is each independently at each occurrence a hydrogen atom or a lower alkyl group;

j is an integer of 1-3 independently per unit $-Y-SiR^{85}_{\ j}R^{86}_{\ 3-j}$;

$R^{83}$ is each independently at each occurrence a hydrogen atom or a lower alkyl group;

p' is each independently at each occurrence an integer of 0-3;

q' is each independently at each occurrence an integer of 0-3;

r' is each independently at each occurrence an integer of 0-3;

$R^e$ is each independently at each occurrence $-Y-SiR^{85}_{\ j}R^{86}_{\ 3-j}$;

$R^f$ is each independently at each occurrence a hydrogen atom or a lower alkyl group;

k' is each independently at each occurrence an integer of 0-3;

l' is each independently at each occurrence an integer of 0-3; and m' is each independently at each occurrence an integer of 0-3;

with the proviso that in the formula at least one q' is 2 or 3, or at least one l' is 2 or 3.

Embodiment 9. The article according to Embodiment 8 wherein PFPE is each independently a group of the following formulae (a)-(c):

(a) $-(OC_3F_6)_b-$ in the formula (a), b is an integer of 1-200;

(b) $-(OC_4F_8)_a-(OC_3F_6)_b-(OC_2F_4)_c-(OCF_2)_d-$ in the formula (b), a and b are each independently an integer of 0-30, c and d are each independently an integer of 1-200, the sum of a, b, c and d is an integer of 10-200, and the occurrence order of the respective repeating units in parentheses with the subscript a, b, c or d is not limited in the formula;

(c) $-(R^{19}-R^{18})_{n''}-$ in the formula (c), $R^{19}$ is $OCF_2$ or $OC_2F_4$, $R^{18}$ is each independently a group selected from $OC_2F_4$, $OC_3F_6$ and $OC_4F_8$, or a combination of 2 or 3 groups independently selected from these groups, and n" is an integer of 2-100.

Embodiment 10. The article according to Embodiment 8 or 9 wherein in PFPE:

$OC_4F_8-$ is $-OCF_2CF_2CF_2CF_2-$, $OC_3F_6-$ is $-OCF_2CF_2CF_2-$, and $OC_2F_4-$ is $-OCF_2CF_2$.

Embodiment 11. The article according to any one of Embodiments 8-10 wherein the surface treating agent further comprises one or more components selected form a fluorine-containing oil, a silicone oil and a catalyst.

Embodiment 12. The article according to Embodiment 11 wherein the fluorine containing oil is one or more compounds of the formula (3):

$Rf^1—(OC_4 F_8)_{a'}—(OC_3F_6)_{b'}—(OC_2 F_4)_{c'}—(OCF_2)_{d'}—RF^2$ (3)

wherein:

$Rf^1$ is an alkyl group having 1-16 carbon atoms which may be substituted by one or more fluorine atoms;

$Rf^2$ is an alkyl group having 1-16 carbon atoms which may be substituted by one or more fluorine atoms, a fluorine atom or a hydrogen atom; and a', b', c' and d' are the repeating number of each of four repeating units of perfluoropolyether which constitute a main backbone of the polymer, and are each independently an integer of 0-300, the sum of a', b', c' and d' is 1 or more, and the occurrence order of the respective repeating units in parentheses with the subscript a', b', c' and d' is not limited in the formula.

Embodiment 13. The article according to Embodiment 11 or 12 wherein the fluorine containing oil is one or more compounds of the formula (3a) or (3b):

$Rf^1—(OCF_2 CF_2 CF_2)_{b''}-Rf^2$ (3a)

$Rf^1—(OCF_2 CF_2 CF_2 CF_2)_{a''}—(OCF_2 CF_2 CF_2)_{b''}—(OCF_2 CF_2)_{c''}—(OCF_2)_{d''}—Rf^2$ (3b)

wherein:

$Rf^1$ is an alkyl group having 1-16 carbon atoms which may be substituted by one or more fluorine atoms;

$Rf^2$ is an alkyl group having 1-16 carbon atoms which may be substituted by one or more fluorine atoms, a fluorine atom or a hydrogen atom;

in the formula (3a), b'' is an integer of 1-100;

in the formula (3b), a'' and b'' are each independently an integer of 0-30, and c'' and d'' are each independently an integer of 1-300; and the occurrence order of the respective repeating units in parentheses with the subscript a'', b'', c'' or d'' is not limited in the formula.

Embodiment 14. The article according to any one of Embodiments 1-13 wherein the article is a housing, a glassframe or a jewelry article.

Embodiment 15. A process for forming a surface treating layer from a surface treating agent comprising a fluorine-containing silane compound on a base material of zirconium oxide, comprising:

forming an intermediate layer from one or more metal oxides on the base material of zirconium oxide, and then forming the surface treating layer from a surface treating agent comprising a fluorine-containing silane compound on the intermediate layer.

Embodiment 16. The process according to Embodiment 15 wherein the intermediate layer comprises silicon oxide or aluminum oxide.

Embodiment 17. The process according to Embodiment 15 or 16 wherein the intermediate layer comprises silicon oxide.

Embodiment 18. The process according to any one of Embodiments 15-17 wherein the intermediate layer comprises silicon oxide and aluminum oxide.

Embodiment 19. The process according to any one of Embodiments 15-18 wherein the intermediate layer further comprises zirconium oxide.

Embodiment 20. The process according to any one of Embodiments 15-19 wherein the formation of the intermediate layer is performed by forming an aluminum oxide layer on the base material of zirconium oxide, and then forming a silicon oxide layer on the aluminum oxide layer.

Embodiment 21. A process for producing an article comprising a base material of zirconium oxide, an intermediate layer located on the base material, and a surface treating layer formed from a surface treating agent comprising a fluorine-containing silane compound located on the intermediate layer, comprising:

forming an intermediate layer from one or more metal oxides on the base material of zirconium oxide, and then, forming the surface treating layer from a surface treating agent comprising a fluorine-containing silane compound on the intermediate layer.

Embodiment 22. The process according to Embodiment 21 wherein the formation of the intermediate layer is performed by forming an aluminum oxide layer on the base material of zirconium oxide, and then forming a silicon oxide layer on the aluminum oxide layer.

The invention claimed is:

1. An article comprising
a base material of zirconium oxide,
an intermediate layer located on the base material, and
a surface treating layer formed from a surface treating agent comprising a fluorine-containing silane compound located on the intermediate layer,
wherein the intermediate layer comprises one or more metal oxides, and
a total thickness of the intermediate layers is 80 nm or less.

2. The article according to claim 1 wherein the intermediate layer comprises silicon oxide.

3. The article according to claim 1 wherein the intermediate layer comprises silicon oxide and aluminum oxide.

4. The article according to claim 1 wherein the intermediate layer is composed of a plurality of metal oxide layers.

5. The article according to claim 1 wherein
the intermediate layer is composed of a plurality of metal oxide layers,
the metal oxide layer contacting to the base material is an aluminum oxide layer, and
the metal oxide layer contacting to the surface treating layer is a silicon oxide layer.

6. The article according to claim 1 wherein the article is a housing, a glassframe or a jewelry article.

7. The article according to claim 1 wherein the total thickness of the intermediate layers is 50 nm or less.

8. The article according to claim 1 wherein the total thickness of the intermediate layers is 40 nm or less.

9. The article according to claim 1 wherein the intermediate layer comprises silicon oxide or aluminum oxide.

10. The article according to claim 9 wherein the intermediate layer further comprises zirconium oxide.

11. The article according to claim 1 wherein the fluorine-containing silane compound is one or more compounds of the general formula (A1), (A2), (B1), (B2), (C1), (C2), (D1) or (D2):

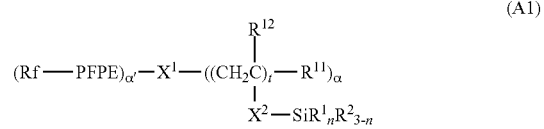

(A1)

-continued

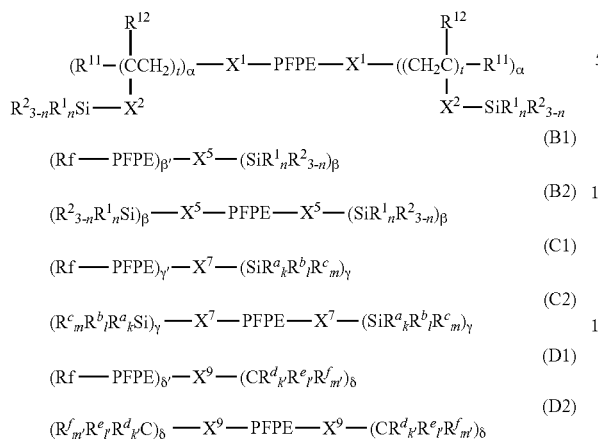

$$(Rf—PFPE)_{\beta'}—X^5—(SiR^1{}_nR^2{}_{3-n})_\beta \quad (B1)$$

$$(R^2{}_{3-n}R^1{}_nSi)_\beta—X^5—PFPE—X^5—(SiR^1{}_nR^2{}_{3-n})_\beta \quad (B2)$$

$$(Rf—PFPE)_{\gamma'}—X^7—(SiR^a{}_kR^b{}_lR^c{}_m)_\gamma \quad (C1)$$

$$(R^c{}_mR^b{}_lR^a{}_kSi)_\gamma—X^7—PFPE—X^7—(SiR^a{}_kR^b{}_lR^c{}_m)_\gamma \quad (C2)$$

$$(Rf—PFPE)_{\delta'}—X^9—(CR^d{}_{k'}R^e{}_{l'}R^f{}_{m'})_\delta \quad (D1)$$

$$(R^f{}_{m'}R^e{}_{l'}R^d{}_{k'}C)_\delta—X^9—PFPE—X^9—(CR^d{}_{k'}R^e{}_{l'}R^f{}_{m'})_\delta \quad (D2)$$

wherein:
PFPE is each independently at each occurrence a group of the formula:

$$—(OC_4F_8)_a—(OC_3F_6)_b—(OC_2F_4)_c—(OCF_2)_d—$$

wherein a, b, c and d are each independently an integer of 0-200, the sum of a, b, c and d is at least one, and the occurrence order of the respective repeating units in parentheses with the subscript a, b, c or d is not limited in the formula;

Rf is each independently at each occurrence an alkyl group having 1-16 carbon atoms which may be substituted by one or more fluorine atoms;

$R^1$ is each independently at each occurrence a hydrogen atom or an alkyl group having 1-22 carbon atoms;

$R^2$ is each independently at each occurrence a hydroxyl group or a hydrolyzable group;

$R^{11}$ is each independently at each occurrence a hydrogen atom or a halogen atom;

$R^{12}$ is each independently at each occurrence a hydrogen atom or a lower alkyl group;

n is, independently per a unit ($—SiR^1{}_nR^2{}_{3-n}$), an integer of 0-3;

there is at least one $R^2$ in the formulae (A1), (A2), (B1) and (B2);

$X^1$ is each independently a single bond or a 2-10 valent organic group;

$X^2$ is each independently at each occurrence a single bond or a divalent organic group;

t is each independently at each occurrence an integer of 1-10;

α is each independently an integer of 1-9;

α' is each independently an integer of 1-9;

$X^5$ is each independently a single bond or a 2-10 valent organic group;

β is each independently an integer of 1-9;

β' is an integer of 1-9;

$X^7$ is each independently a single bond or a 2-10 valent organic group;

γ is each independently an integer of 1-9;

γ' is an integer of 1-9;

$R^a$ is each independently at each occurrence $—Z—SiR^7{}^1{}_pR^7{}^2{}_qR^7{}^3{}_r$;

Z is each independently at each occurrence an oxygen atom or a divalent organic group;

$R^7{}^1$ is each independently at each occurrence $R^{a'}$;

$R^{a'}$ has the same definition as that of $R^a$;

in $R^a$, the number of Si atoms which are straightly linked via the Z group is up to five;

$R^7{}^2$ is each independently at each occurrence a hydroxyl group or a hydrolyzable group;

$R^7{}^3$ is each independently at each occurrence a hydrogen atom or a lower alkyl group;

p is each independently at each occurrence an integer of 0-3;

q is each independently at each occurrence an integer of 0-3;

r is each independently at each occurrence an integer of 0-3;

in each $—Z—SiR^7{}^1{}_pR^7{}^2{}_qR^7{}^3{}_r$, the sum of p, q and r is 3, and there is at least one $R^7{}^2$ in the formula (C1) and (C2);

$R^b$ is each independently at each occurrence a hydroxyl group or a hydrolyzable group;

$R^c$ is each independently at each occurrence a hydrogen atom or a lower alkyl group;

k is each independently at each occurrence an integer of 1-3;

l is each independently at each occurrence an integer of 0-2;

m is each independently at each occurrence an integer of 0-2;

the sum of k, l and m is 3 in each unit in parentheses with the subscript γ;

$X^9$ is each independently a single bond or a 2-10 valent organic group;

δ is each independently an integer of 1-9;

δ' is an integer of 1-9;

$R^d$ is each independently at each occurrence $—Z'—CR^8{}^1{}_pR^8{}^2{}_qR^8{}^3{}_r$;

Z' is each independently at each occurrence an oxygen atom or a divalent organic group;

$R^{81}$ is each independently at each occurrence $R^{d'}$;

$R^{d'}$ has the same definition as that of $R^d$;

in $R^d$, the number of C atoms which are straightly linked via the Z' group is up to five;

$R^{82}$ is each independently at each occurrence $—Y—SiR^{85}{}_jR^{86}{}_{3-j}$;

Y is each independently at each occurrence a divalent organic group;

$R^{85}$ is each independently at each occurrence a hydroxyl group or a hydrolyzable group;

$R^{86}$ is each independently at each occurrence a hydrogen atom or a lower alkyl group;

j is an integer of 1-3 independently per unit $—Y—SiR^{85}{}_jR^{86}{}_{3-j}$;

$R^{83}$ is each independently at each occurrence a hydrogen atom or a lower alkyl group;

p' is each independently at each occurrence an integer of 0-3;

q' is each independently at each occurrence an integer of 0-3;

r' is each independently at each occurrence an integer of 0-3;

$R^e$ is each independently at each occurrence $—Y—SiR^{85}{}_jR^{86}{}_{3-j}$;

$R^f$ is each independently at each occurrence a hydrogen atom or a lower alkyl group;

k' is each independently at each occurrence an integer of 0-3;

l' is each independently at each occurrence an integer of 0-3; and $m'$ is each independently at each occurrence an integer of 0-3;

with the proviso that in the formula at least one $q'$ is 2 or 3, or at least one $l'$ is 2 or 3.

12. The article according to claim 11 wherein PFPE is each independently a group of the following formulae (a)-(c):

$$-(OC_3F_6)_b-\quad\quad (a)$$

in the formula (a), b is an integer of 1-200;

$$-(OC_4F_8)_a-(OC_3F_6)_b-(OC_2F_4)_c-(OCF_2)_d-\quad\quad (b)$$

in the formula (b), a and b are each independently an integer of 0-30, c and d are each independently an integer of 1-200, the sum of a, b, c and d is an integer of 10-200, and the occurrence order of the respective repeating units in parentheses with the subscript a, b, c or d is not limited in the formula;

$$-(R^{19}-R^{18})_{n''}-\quad\quad (c)$$

in the formula (c), $R^{19}$ is $OCF_2$ or $OC_2F_4$, $R^{18}$ is each independently a group selected from $OC_2F_4$, $OC_3F_6$ and $OC_4F_8$, or a combination of 2 or 3 groups independently selected from these groups, and $n''$ is an integer of 2-100.

13. The article according to claim 11 wherein in PFPE:

$-OC_4F_8-$ is $-OCF_2CF_2CF_2CF_2-$;

$-OC_3F_6-$ is $-OCF_2CF_2CF_2-$, and $OC_2F_4-$ is $OCF_2CF_2-$.

14. The article according to claim 11 wherein the surface treating agent further comprises one or more components selected from a fluorine-containing oil, a silicone oil and a catalyst.

15. The article according to claim 14 wherein the fluorine containing oil is one or more compounds of the formula (3):

$$Rf^1-(OC_4F_8)_{a'}-(OC_3F_6)_{b'}-(OC_2F_4)_{c'}-(OCF_2)_{d'}Rf^2\quad\quad (3)$$

wherein:

$Rf^1$ is an alkyl group having 1-16 carbon atoms which may be substituted by one or more fluorine atoms;

$Rf^2$ is an alkyl group having 1-16 carbon atoms which may be substituted by one or more fluorine atoms, a fluorine atom or a hydrogen atom; and a', b', c' and d' are the repeating number of each of four repeating units of perfluoropolyether which constitute a main backbone of the polymer, and are each independently an integer of 0-300, the sum of a', b', c' and d' is 1 or more, and the occurrence order of the respective repeating units in parentheses with the subscript a', b', c' and d' is not limited in the formula.

16. The article according to claim 14 wherein the fluorine containing oil is one or more compounds of the formula (3a) or (3b):

$$Rf^1-(OCF_2CF_2CF_2)_{b''}-Rf^2\quad\quad (3a)$$

$$Rf^1-(OCF_2CF_2CF_2CF_2)_{a''}-(OCF_2CF_2CF_2)_{b''}-(OCF_2CF_2)_{c''}-(OCF_2)_{d''}-Rf^2\quad\quad (3b)$$

wherein:

$Re^1$ is an alkyl group having 1-16 carbon atoms which may be substituted by one or more fluorine atoms;

$Rf^2$ is an alkyl group having 1-16 carbon atoms which may be substituted by one or more fluorine atoms, a fluorine atom or a hydrogen atom;

in the formula (3a), $b''$ is an integer of 1-100;

in the formula (3b), $a''$ and $b''$ are each independently an integer of 0-30, and $c''$ and $d''$ are each independently an integer of 1-300; and the occurrence order of the respective repeating units in parentheses with the subscript $a''$, $b''$, $c''$ or $d''$ is not limited in the formula.

17. A process for producing the article according to claim 1, forming the intermediate layer from one or more metal oxides on the base material of zirconium oxide, and then, forming the surface treating layer from a surface treating agent comprising a fluorine-containing silane compound on the intermediate layer.

18. The process according to claim 17 wherein the formation of the intermediate layer is performed by forming an aluminum oxide layer on the base material of zirconium oxide, and then forming a silicon oxide layer on the aluminum oxide layer.

\* \* \* \* \*